(12) United States Patent
Xu et al.

(10) Patent No.: US 12,484,074 B2
(45) Date of Patent: Nov. 25, 2025

(54) RESOURCE SHARING BETWEEN BASE STATIONS AND ANCHOR USER EQUIPMENTS ON SIDELINK CHANNELS

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 489 days.

(21) Appl. No.: 17/997,708

(22) PCT Filed: Jun. 9, 2020

(86) PCT No.: PCT/CN2020/095040
§ 371 (c)(1),
(2) Date: Nov. 1, 2022

(87) PCT Pub. No.: WO2021/248296
PCT Pub. Date: Dec. 16, 2021

(65) Prior Publication Data
US 2023/0180265 A1    Jun. 8, 2023

(51) Int. Cl.
*H04W 72/25*    (2023.01)
(52) U.S. Cl.
CPC .................................. *H04W 72/25* (2023.01)
(58) Field of Classification Search
CPC .................................................. H04W 72/25
See application file for complete search history.

(56) References Cited

U.S. PATENT DOCUMENTS

2019/0254059 A1*  8/2019  Gulati ................ H04W 72/542
2020/0107236 A1   4/2020  Tseng et al.
(Continued)

FOREIGN PATENT DOCUMENTS

| CN | 110447294 A | 11/2019 |
| CN | 110999516 A | 4/2020 |
| EP | 3836686 A1 | 6/2021 |

(Continued)

OTHER PUBLICATIONS

ASUSTEK: "Discussion on Resource Pool and Bandwidth Part", R1-1813515, 3rd Generation Partnership Project, Mobile Competence Centre 650, Route Des Lucioles, F-06921 Sophia-Antipolis Cedex, France, vol. RAN WG1, No. Spokane, USA, Nov. 12, 2018-Nov. 16, 2018, Nov. 11, 2018, 4 Pages, XP051555570, subclause 2 Discussion.

(Continued)

*Primary Examiner* — Duc C Ho
(74) *Attorney, Agent, or Firm* — Harrity & Harrity, LLP \ Qualcomm

(57) ABSTRACT

Various aspects of the present disclosure generally relate to wireless communication. In some aspects, a first user equipment (UE) may receive, from a base station, a configuration message, wherein the configuration message indicates a first set of resources reserved for the base station and a second set of resources reserved for the first UE; and communicate, with at least one second UE, on a sidelink channel using the second set of resources. Numerous other aspects are provided.

20 Claims, 18 Drawing Sheets

(56) References Cited

U.S. PATENT DOCUMENTS

| | | | |
|---|---|---|---|
| 2021/0336756 A1* | 10/2021 | Chae | H04L 5/1469 |
| 2023/0217468 A1* | 7/2023 | Hui | H04W 72/25 |
| | | | 370/329 |

FOREIGN PATENT DOCUMENTS

| | | |
|---|---|---|
| WO | 2019195151 A1 | 10/2019 |
| WO | 2020030177 A1 | 2/2020 |
| WO | 2020064555 A1 | 4/2020 |

OTHER PUBLICATIONS

Huawei, et al., "Further Views on Rel-17 Work Area on NR Sidelink Enhancements for V2X and other Use Cases", 3GPP Tsg Ran Meeting #85, RP-191831, Mobile Competence Centre, 650, Route Des Lucioles, F-06921 Sophia-Antipolis Cedex, France, vol. TSG RAN No. Newport Beach, USA, Sep. 16, 2019-Sep. 20, 2019, Sep. 9, 2019, XP051782380, 13 Pages, Subclause 2.1.2.5 Sidelink Resource Allocation Enhancements.

Intel Corporation: "Uu-Based Sidelink Resource Allocation for V2X Use Cases", 3GPP TSG RAN WG1 Meeting #96, R1-1902486, 3rd Generation Partnership Project, Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019, XP051600182, 10 pages, subclause 4.2 Uu-based Mechanisms for Sidelink Resource Reservation.

Panasonic: "Discussion on Physical Layer Structure for Sidelink in NR V2X", 3GPP TSG RAN WG1 #99, R1-1912752, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019, XP051820188, pp. 1-11, Subclause 2 Discussion.

Supplementary European Search Report—EP20939631—Search Authority—The Hague—Mar. 26, 2024.

Supplementary Partial European Search Report—EP20939631—Search Authority—The Hague—Jan. 4, 2024.

International Search Report and Written Opinion—PCT/CN2020/095040—ISA/EPO—Feb. 25, 2021.

Nokia, et al., "Discussion of Resource Allocation for Sidelink—Mode 1", 3GPP TSG RAN WG1 Meeting #98bis, R1-1910513, Chongqing, China, Oct. 14, 2019-Oct. 20, 2019, 5 Pages, Oct. 20, 2019 (Oct. 20, 2019), Section 2.

* cited by examiner

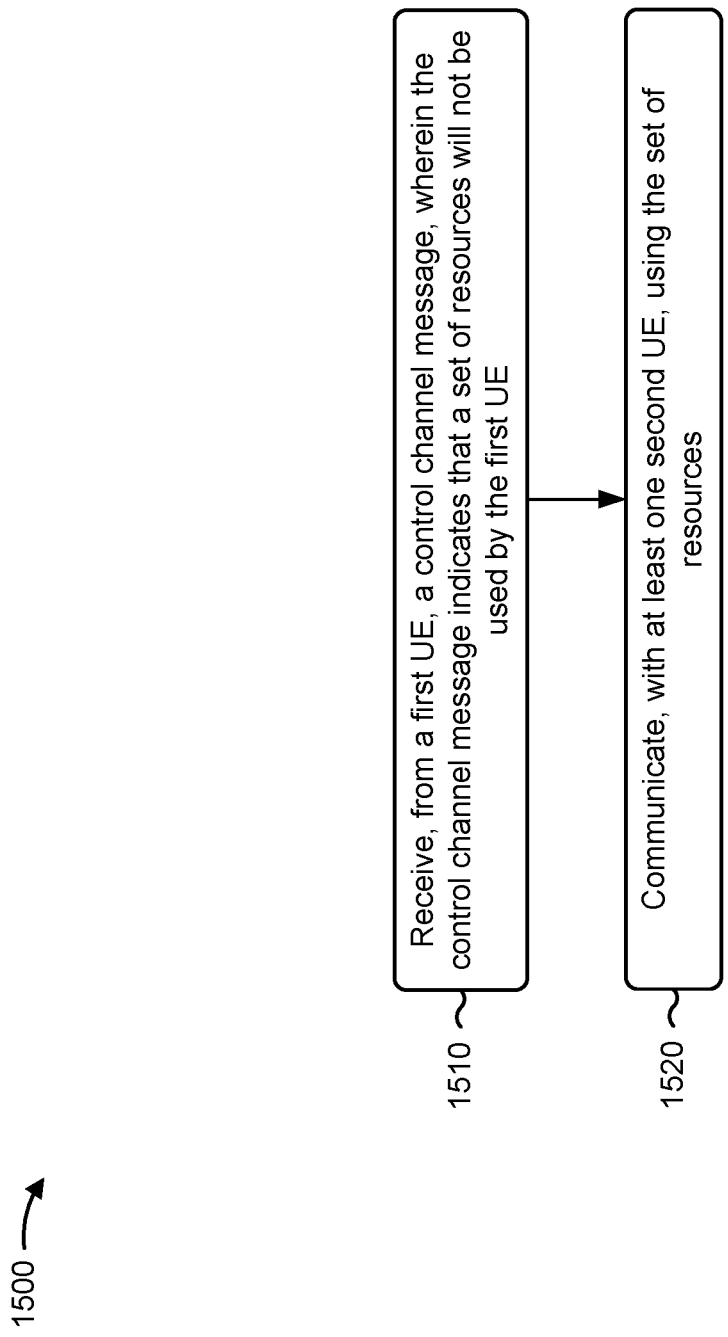

RESOURCE SHARING BETWEEN BASE STATIONS AND ANCHOR USER EQUIPMENTS ON SIDELINK CHANNELS

CROSS-REFERENCE TO RELATED APPLICATION

This application is a 35 U.S.C. 371 national stage application of PCT Application No. PCT/CN2020/095040, filed on Jun. 9, 2020, entitled "RESOURCE SHARING BETWEEN BASE STATIONS AND ANCHOR USER EQUIPMENTS ON SIDELINK CHANNELS," which is expressly incorporated by reference herein.

FIELD OF THE DISCLOSURE

Aspects of the present disclosure generally relate to wireless communication and to techniques and apparatuses for resource sharing between base stations and anchor user equipments (UEs) on sidelink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a first user equipment (UE), may include receiving, from a base station, a configuration message, wherein the configuration message indicates a first set of resources reserved for the base station and a second set of resources reserved for the first UE; and communicating, with at least one second UE, on a sidelink channel using the second set of resources.

In some aspects, a method of wireless communication, performed by a base station, may include transmitting, to a first UE, a configuration message, wherein the configuration message indicates a first set of resources reserved for the base station and a second set of resources reserved for the first UE; and communicating, with at least one second UE, using the first set of resources.

In some aspects, a method of wireless communication, performed by a first UE, may include transmitting, to a base station, a control channel message, wherein the control channel message indicates that a set of resources is to be used by the first UE; and communicating, with at least one second UE, on a sidelink channel using the set of resources.

In some aspects, a method of wireless communication, performed by a base station, may include receiving, from a first UE, a control channel message, wherein the control channel message indicates that a set of resources will not be used by the first UE; and communicating, with at least one second UE, using the set of resources.

In some aspects, a non-transitory computer-readable medium may store one or more instructions for wireless communication. The one or more instructions, when executed by one or more processors of a first UE, may cause the one or more processors to receive, from a base station, a configuration message, wherein the configuration message indicates a first set of resources reserved for the base station and a second set of resources reserved for the first UE; and communicate, with at least one second UE, on a sidelink channel using the second set of resources.

In some aspects, a non-transitory computer-readable medium may store one or more instructions for wireless communication. The one or more instructions, when executed by one or more processors of a base station, may cause the one or more processors to transmit, to a first UE, a configuration message, wherein the configuration message indicates a first set of resources reserved for the base station and a second set of resources reserved for the first UE; and communicate, with at least one second UE, using the first set of resources.

In some aspects, a non-transitory computer-readable medium may store one or more instructions for wireless communication. The one or more instructions, when executed by one or more processors of a first UE, may cause the one or more processors to transmit, to a base station, a control channel message, wherein the control channel message indicates that a set of resources is to be used by the first UE; and communicate, with at least one second UE, on a sidelink channel using the set of resources.

In some aspects, a non-transitory computer-readable medium may store one or more instructions for wireless communication. The one or more instructions, when executed by one or more processors of a base station, may cause the one or more processors to receive, from a first UE, a control channel message, wherein the control channel message indicates that a set of resources will not be used by the first UE; and communicate, with at least one second UE, using the set of resources.

In some aspects, a first UE for wireless communication may include a memory and one or more processors operatively coupled to the memory. The memory and the one or more processors may be configured to receive, from a base station, a configuration message, wherein the configuration message indicates a first set of resources reserved for the base station and a second set of resources reserved for the first UE; and communicate, with at least one second UE, on a sidelink channel using the second set of resources.

In some aspects, a base station for wireless communication may include a memory and one or more processors operatively coupled to the memory. The memory and the one or more processors may be configured to transmit, to a first UE, a configuration message, wherein the configuration message indicates a first set of resources reserved for the base station and a second set of resources reserved for the first UE; and communicate, with at least one second UE, using the first set of resources.

In some aspects, a first UE for wireless communication may include a memory and one or more processors operatively coupled to the memory. The memory and the one or more processors may be configured to transmit, to a base station, a control channel message, wherein the control channel message indicates that a set of resources is to be used by the first UE; and communicate, with at least one second UE, on a sidelink channel using the set of resources.

In some aspects, a base station for wireless communication may include a memory and one or more processors operatively coupled to the memory. The memory and the one or more processors may be configured to receive, from a first UE, a control channel message, wherein the control channel message indicates that a set of resources will not be used by the first UE; and communicate, with at least one second UE, using the set of resources.

In some aspects, an apparatus for wireless communication may include means for receiving, from a base station, a configuration message, wherein the configuration message indicates a first set of resources reserved for the base station and a second set of resources reserved for the apparatus; and means for communicating, with at least one UE, on a sidelink channel using the second set of resources.

In some aspects, an apparatus for wireless communication may include means for transmitting, to a first UE, a configuration message, wherein the configuration message indicates a first set of resources reserved for the apparatus and a second set of resources reserved for the first UE; and means for communicating, with at least one second UE, using the first set of resources.

In some aspects, an apparatus for wireless communication may include means for transmitting, to a base station, a control channel message, wherein the control channel message indicates that a set of resources is to be used by the apparatus; and means for communicating, with at least one UE, on a sidelink channel using the set of resources.

In some aspects, an apparatus for wireless communication may include means for receiving, from a first UE, a control channel message, wherein the control channel message indicates that a set of resources will not be used by the first UE; and means for communicating, with at least one second UE, using the set of resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 15 is a diagram illustrating another example process performed by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
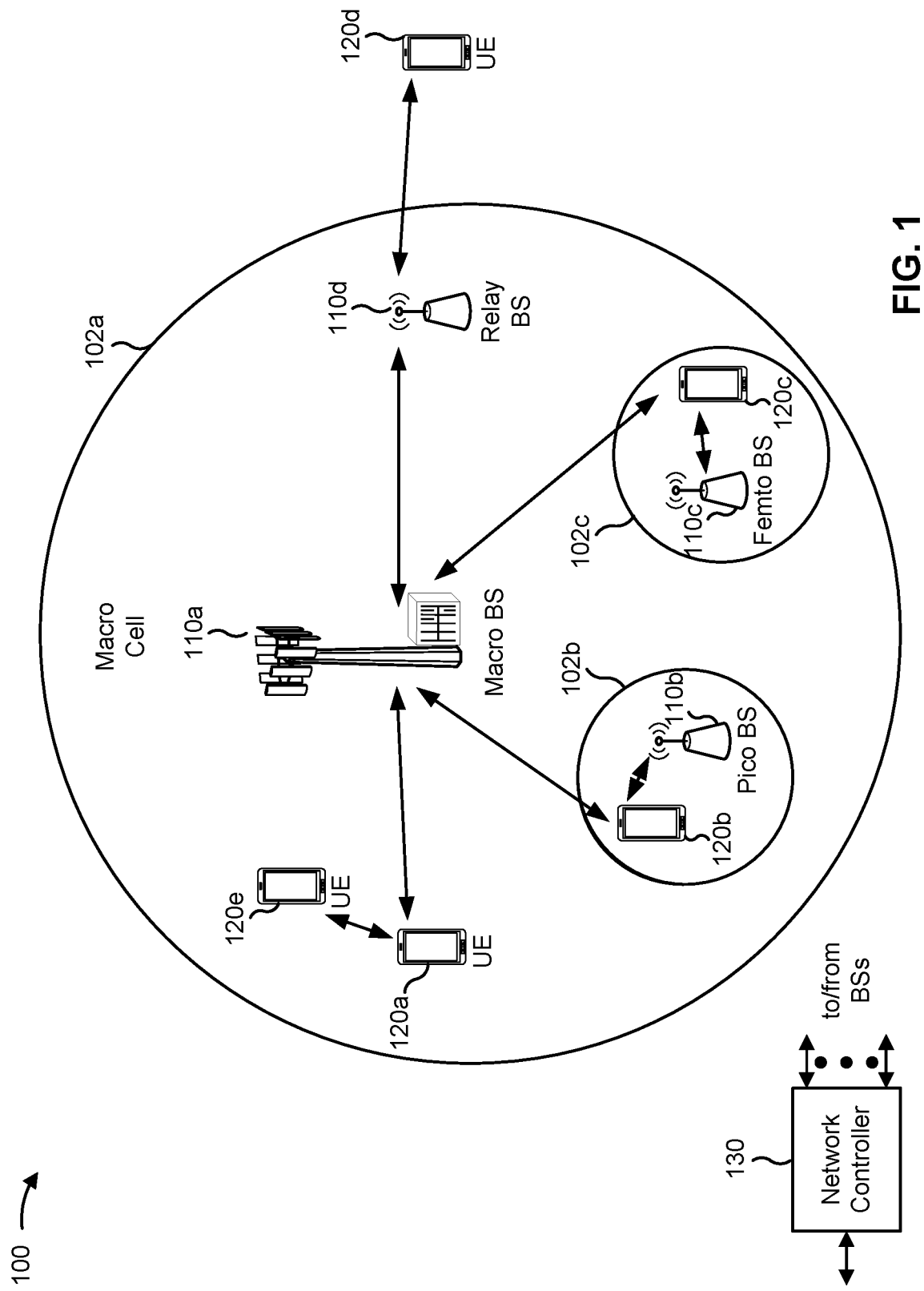
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BS s may be interconnected to one another and/or to one or more other BS s or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
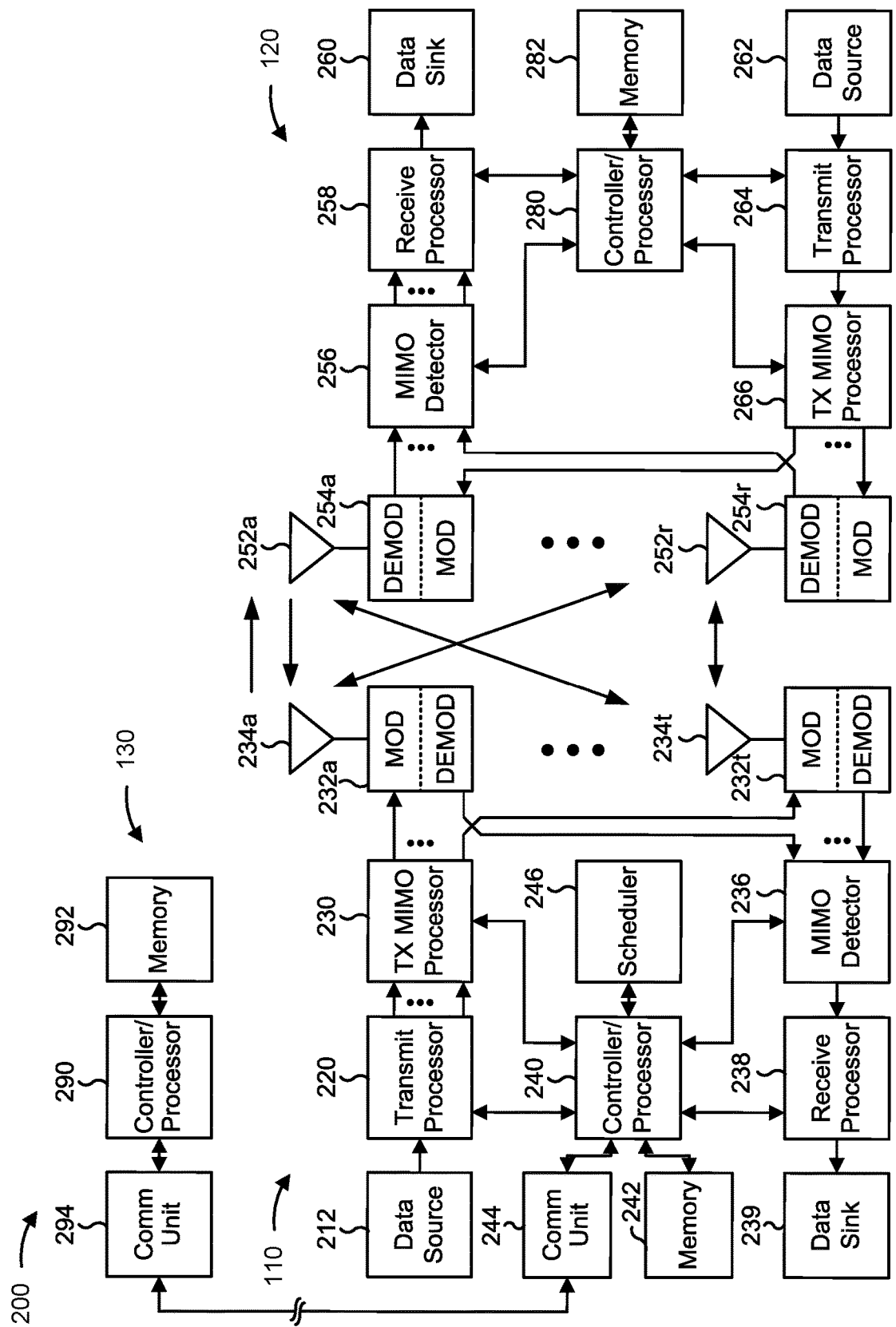
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7A-15.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7A-15.

Controller/processor 240 of base station 110, controller/processor 280 of UE 120, and/or any other component(s) of FIG. 2 may perform one or more techniques associated with resource sharing between base stations and anchor UEs on sidelink channels, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, interpreting the instructions, and/or the like.

In some aspects, a first UE (e.g., UE 120) may include means for receiving, from a base station, a configuration message, wherein the configuration message indicates a first set of resources reserved for the base station and a second set of resources reserved for the first UE; means for communicating, with at least one second UE, on a sidelink channel using the second set of resources; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

Additionally, or alternatively, a first UE (e.g., UE 120) may include means for transmitting, to a base station, a control channel message, wherein the control channel message indicates that a set of resources is to be used by the first UE; means for communicating, with at least one second UE, on a sidelink channel using the set of resources; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a base station (e.g., base station 110) may include means for transmitting, to a first UE, a configuration message, wherein the configuration message indicates a first set of resources reserved for the base station and a second set of resources reserved for the first UE; means for communicating, with at least one second UE, using the first set of resources; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

Additionally, or alternatively, a base station (e.g., base station 110) may include means for receiving, from a first UE, a control channel message, wherein the control channel message indicates that a set of resources will not be used by the first UE; means for communicating, with at least one second UE, using the set of resources; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
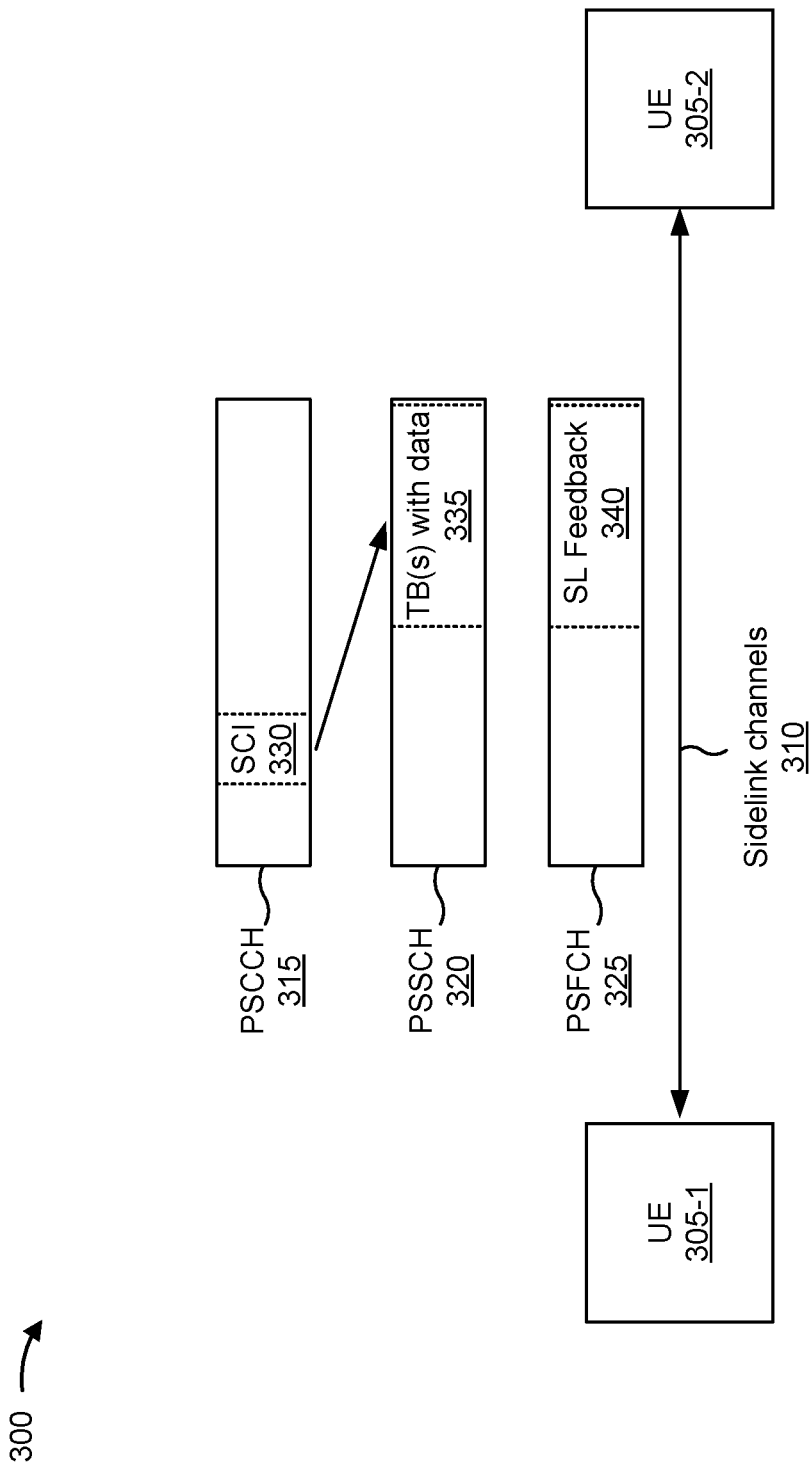
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
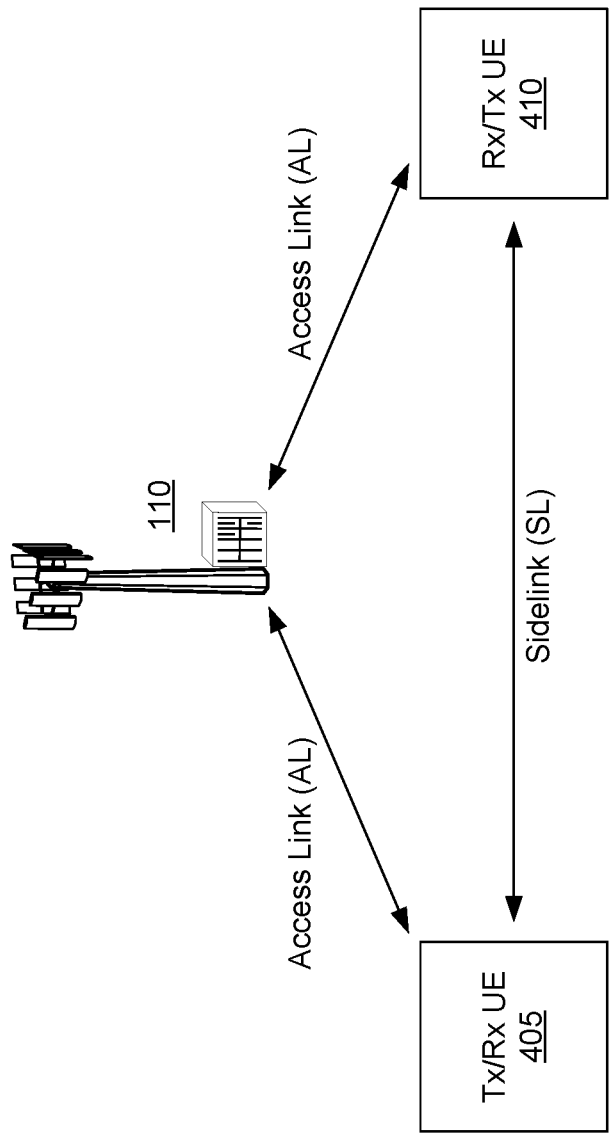
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
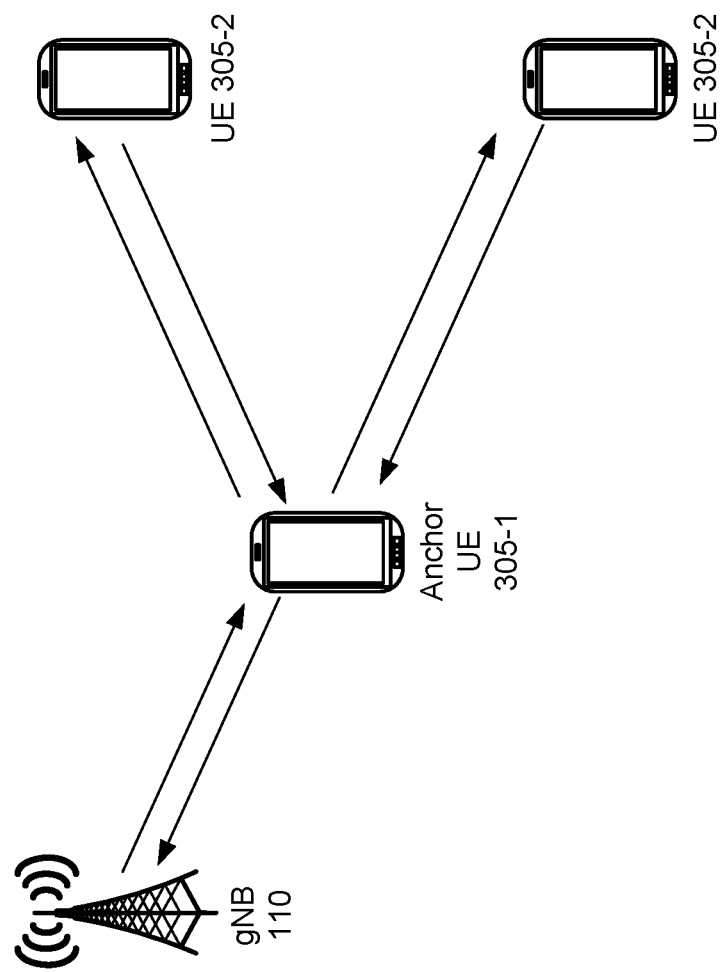
FIG. 5 is a diagram illustrating an example of anchor-based sidelink communications, in accordance with various aspects of the present disclosure.

FIG. 5 is a diagram illustrating an example 500 of anchor-based sidelink communications, in accordance with various aspects of the present disclosure. As shown in FIG. 5, a UE (e.g., UE 305-1) may serve as an anchor on a sidelink channel with one or more other UEs (e.g., UEs 305-2). Although described below in connection with the anchor UE 305-1 serving two client UEs 305-2, the description applies equally to the anchor UE 305-1 serving a single client UE or to more than two client UEs, such as three, four, and/or the like.

In some aspects, the base station 110 may allocate resources to the anchor UE 305-1 to use for sidelink communications with the client UEs 305-2. The anchor UE 305-1 may handle scheduling of sidelink communications with the client UEs 305-2 and allocate resources to the client UEs 305-2 based at least in part on the resources allocated by the base station 110. Accordingly, the anchor UE 305-1 may serve as a controller on a PC5 interface between the anchor UE 305-1 and the client UEs 305-2 similar to the base station 110 serving as a controller on a Uu interface between the base station 110 and the anchor UE 305-1.

In some aspects, the anchor UE 305-1 may indicate resources (e.g., allocated by the base station 110 and/or autonomously or semi-autonomously selected by the anchor UE 305-1) for sidelink communications to the client UEs 305-2 using at least two communications. For example, the anchor UE 305-1 may transmit, to the client UEs 305-2, first control information (e.g., first stage sidelink control information (SCI-1) and/or the like). In some aspects, the anchor UE 305-1 may transmit the first control information on a PSCCH. The first control information may include a resource assignment for a PSSCH, a DMRS for the PSSCH, an MCS for the PSSCH, and/or the like.

In some aspects, the anchor UE 305-1 may further transmit, to the client UEs 305-2, second control information (e.g., second stage sidelink control information (SCI-2) and/or the like). For example, the second control information may have a size and/or be transmitted on a resource that was indicated in the first control information. In some aspects, the anchor UE 305-1 may transmit the second control information on the PSSCH established by the first control information, as described above. The second control information may include information for decoding transmissions on the PSSCH, information for use in a HARQ process, and/or the like. As a result, the anchor UE 305-1 and the client UEs 305-2 may exchange data on the PSSCH and may exchange acknowledgement (and/or negative-acknowledgement) signals using the HARQ process.

As indicated above, FIG. 5 is provided as an example. Other examples may differ from what is described with respect to FIG. 5.

Figure 6A:
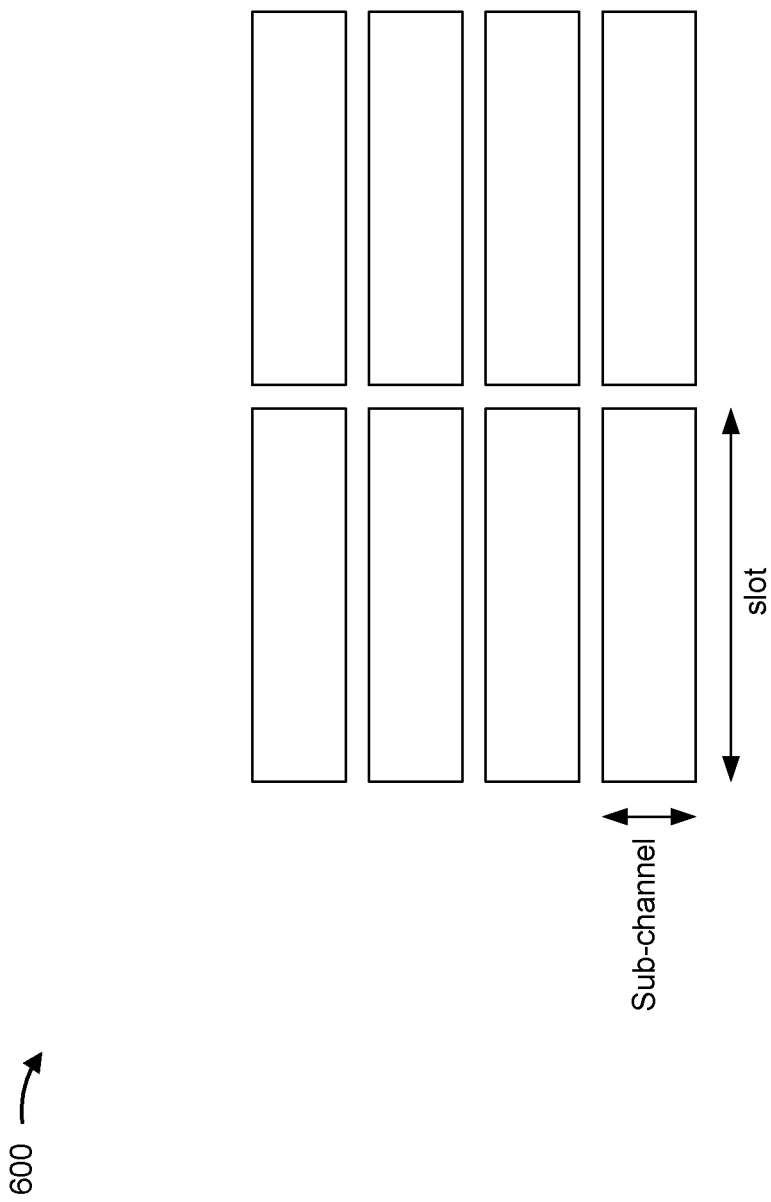
FIG. 6A is a diagram illustrating an example of resource allocations for sidelink communications, in accordance with various aspects of the present disclosure.

FIG. 6A is a diagram illustrating an example 600 of resource allocations for sidelink communications, in accordance with various aspects of the present disclosure. As shown in FIG. 6A, sidelink communications may occupy one or more resource pools that span a frequency domain and a time domain. As shown in example 600, the frequency domain may be divided into sub-channels. As used herein, "sub-channel" may refer to one or more sub-carriers within an LTE, 5G, or other wireless communication structure. Moreover, a sub-carrier may include one or more frequencies that may, in some aspects, be aggregated. As further shown in example 600, the time domain may be divided into slots. As used herein, "slot" may refer to a portion of a radio frame within an LTE, 5G, or other wireless communication structure. In some aspects, a slot may include one or more symbols (e.g., as described below in connection with FIGS. 6B and 6C). Moreover, "symbol" may refer to an orthogonal frequency-division multiplexing (OFDM) symbol or other similar symbol within a slot.

In some aspects, a base station (e.g., base station 110) may allocate (e.g., via radio resource configuration (RRC) and/or the like) sub-channels and slots to an anchor UE (e.g., anchor UE 305-1) for use on a sidelink channel. Accordingly, the anchor UE 305-1 may further allocate (e.g., via RRC and/or the like) sub-channels and slots to client UEs (e.g., client UEs 305-2) based at least in part on the sub-channels and slots allocated by the base station 110. Additionally, or alternatively, the anchor UE 305-1 and/or the client UEs 305-2 may be preloaded (e.g., programmed, stored, and/or the like) with the sub-channels and/or the slots used for sidelink communications.

Figure 6B:
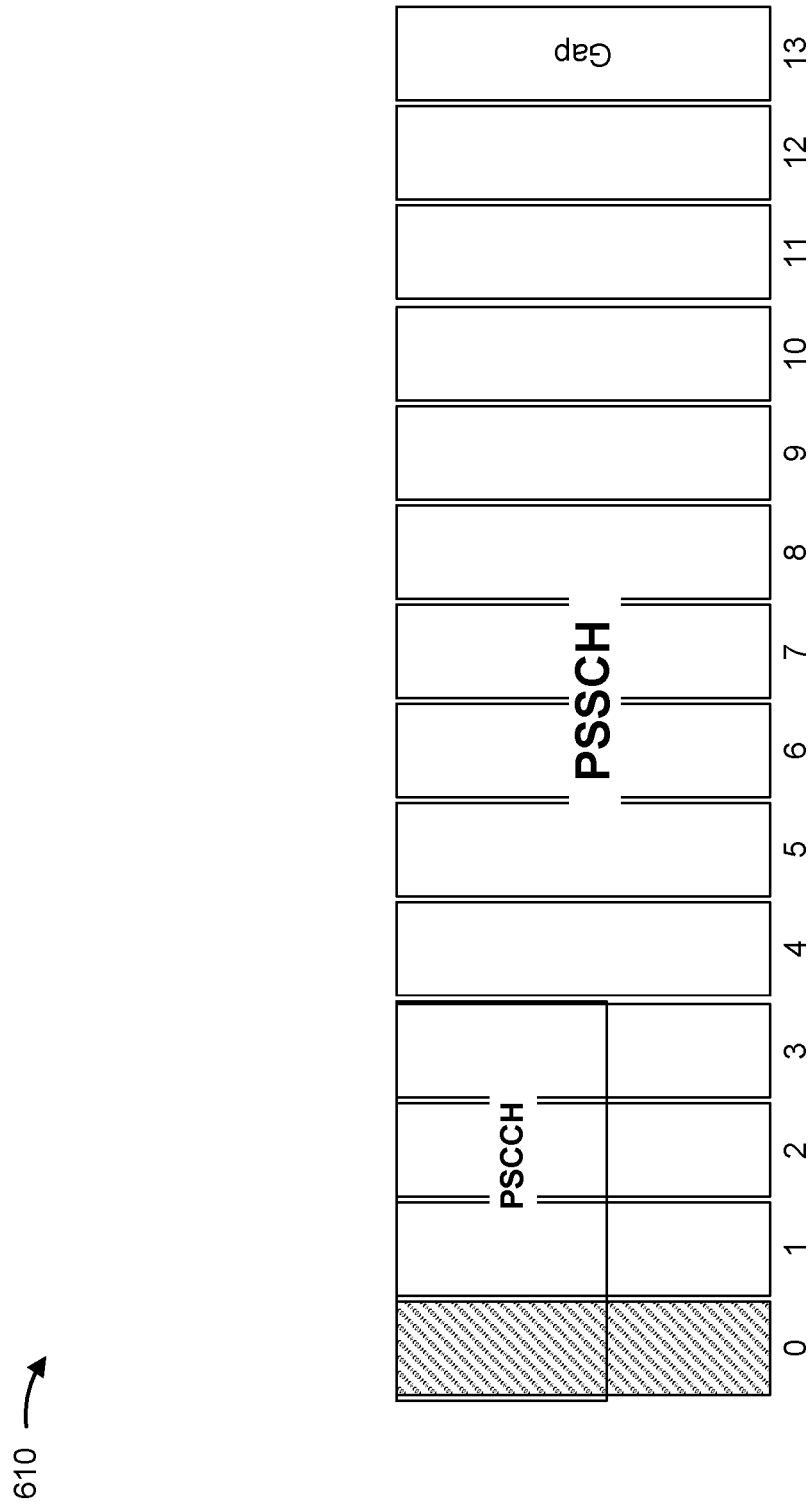
FIGS. 6B and 6C are diagrams illustrating examples of slot structures for sidelink communications, in accordance with various aspects of the present disclosure.
Figure 6C:
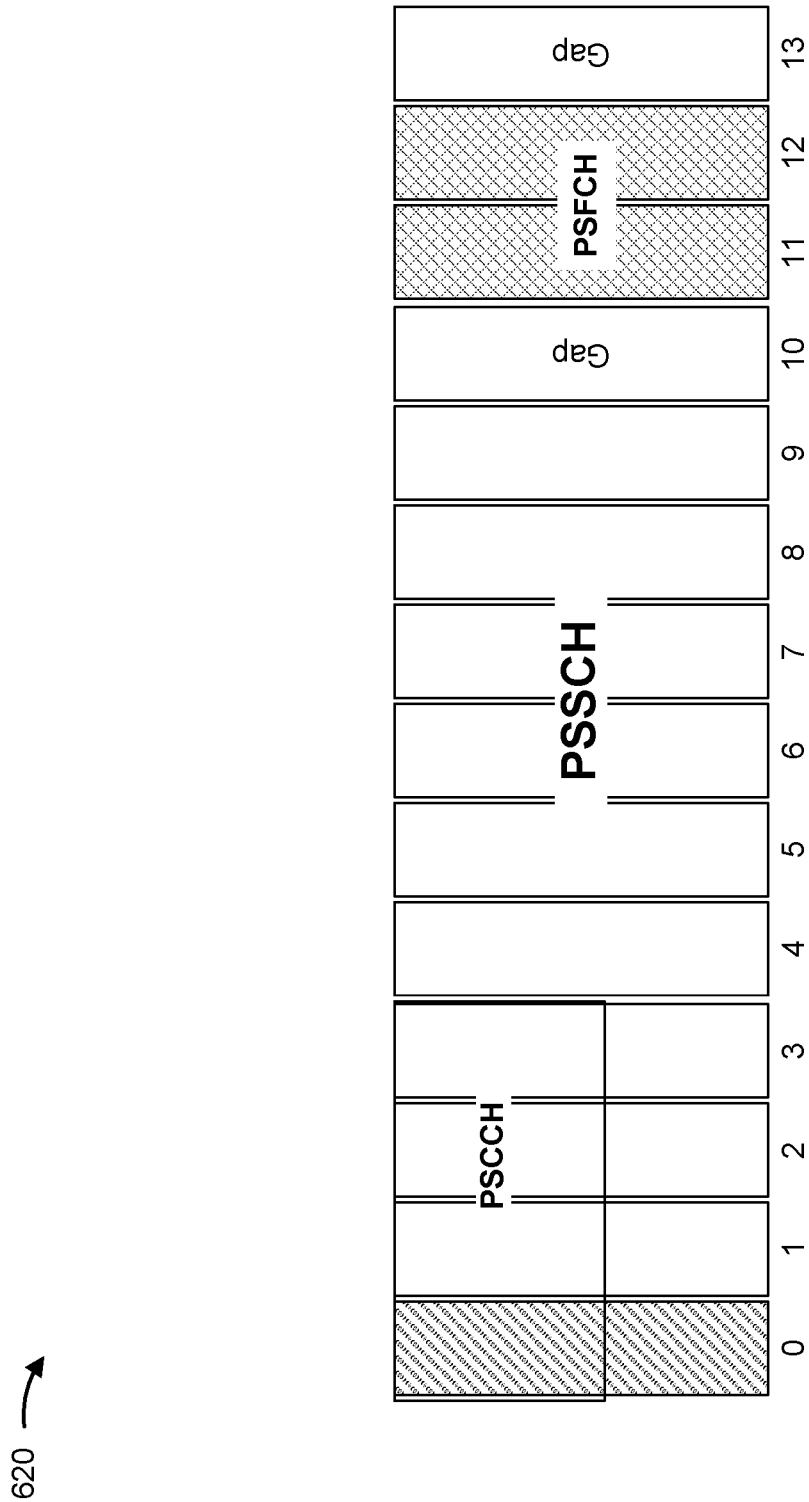

In some aspects, symbols within the slots may be reserved for particular sidelink communications (e.g., according to a 3GPP specification and/or the like). FIGS. 6B and 6C are diagrams illustrating examples 610, 620 of slot structures for sidelink communications, in accordance with various aspects of the present disclosure. Although FIGS. 6B and 6C are described below in connection with 14-symbol slots, the description applies equally to slots with any number of symbols, e.g., twelve, thirteen, fifteen, sixteen, and/or the like.

As shown in FIGS. 6B and 6C, the last symbol (e.g., symbol 13) may be reserved for a gap to prevent inter-slot interference. Additionally, or alternatively, the first symbol (e.g., symbol 0) may be reserved for automatic gain control (AGC). Accordingly, as shown in FIG. 6B, the remaining symbols (e.g., symbols 1-12) may be used for a PSSCH. Moreover, as shown in FIGS. 6B and 6C, a PSCCH may be configured for two, three, and/or the like symbols (e.g., symbols 1-3 in examples 610 and 620).

In some aspects, as shown in FIG. 6C, a slot may include symbols for a physical sidelink feedback channel (PSFCH). Accordingly, one symbol may be reserved for an additional gap (e.g., symbol 10) and one, two, and/or the like symbols may be reserved for the PSFCH (e.g., symbols 11 and 12). Additionally, or alternatively, at least one of the symbols reserved for the PSFCH may be used for AGC.

In some aspects, the PSFCH may be configured with a periodicity greater than one. For example, every two, four, and/or the like slots may be configured for the PSFCH. Accordingly, some slots may be configured similarly to example 610 while other slots may be configured similarly to example 620.

As indicated above, FIGS. 6A-6C are provided as examples. Other examples may differ from what is described with respect to FIGS. 6A-6C.

In some situations, a base station may allocate resources (e.g., sub-channels, slots, or a combination thereof) to an anchor UE for using on a sidelink channel. However, the anchor UE may not use all of the resources allocated by the base station and/or may use the resources allocated by the base station only for some periods of time. Accordingly, resources allocated by the base station to the anchor UE but not used by the anchor UE are wasted and increase network overhead.

Techniques and apparatuses described herein allow a base station (e.g., base station 110) to use resources that the base station 110 allocated to an anchor UE (e.g., anchor UE 305-1) but that the anchor UE 305-1 is not using. Accordingly, the base station 110 may prevent resources from being reserved but unused and thus reduce network overhead. Moreover, the base station 110 may use these resources while still avoiding interference with sidelink communications of the anchor UE 305-1.

Figure 7A:
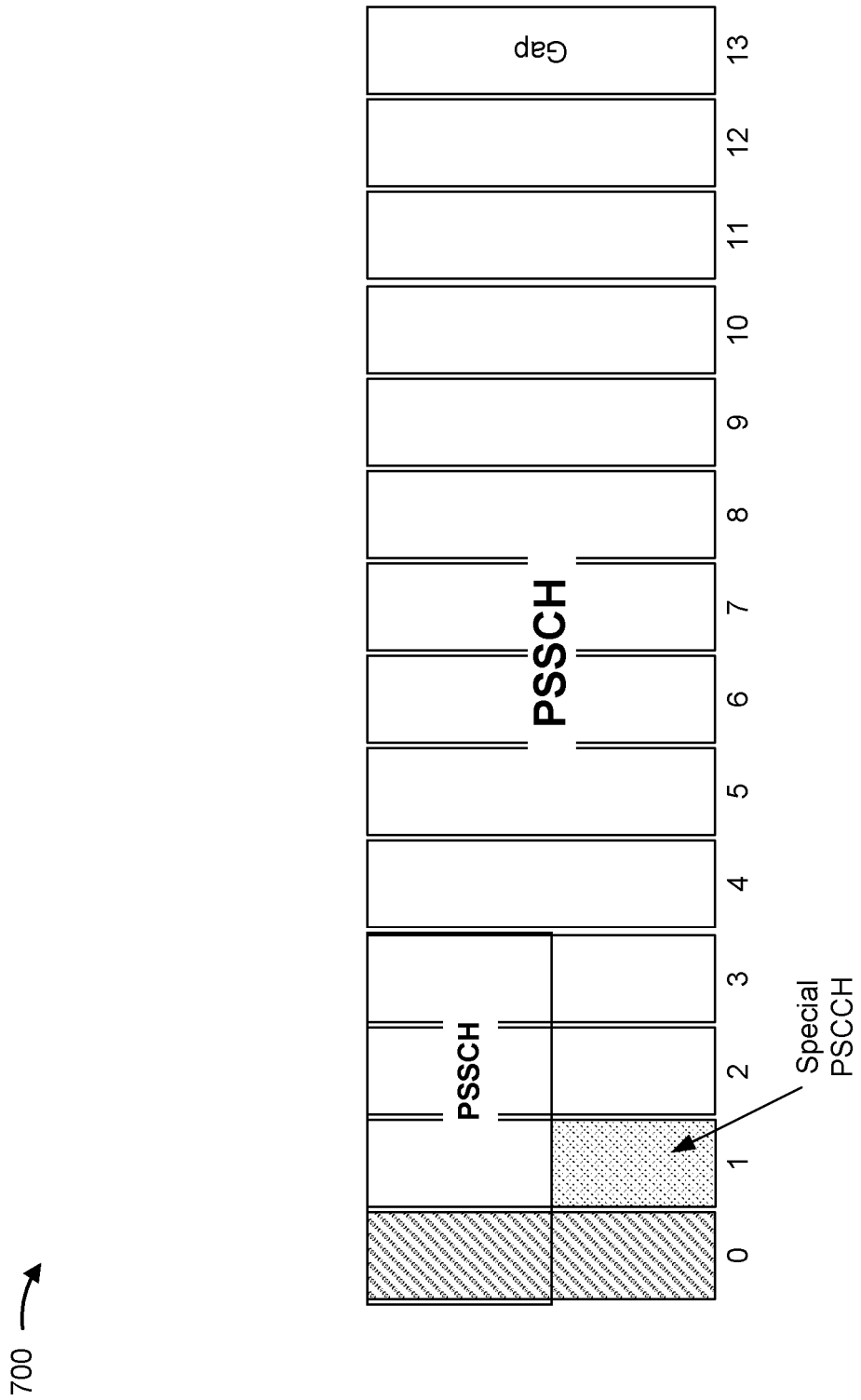
FIGS. 7A and 7B are diagrams illustrating examples associated with signal-based resource sharing between an anchor UE and a base station, in accordance with various aspects of the present disclosure.
Figure 7B:
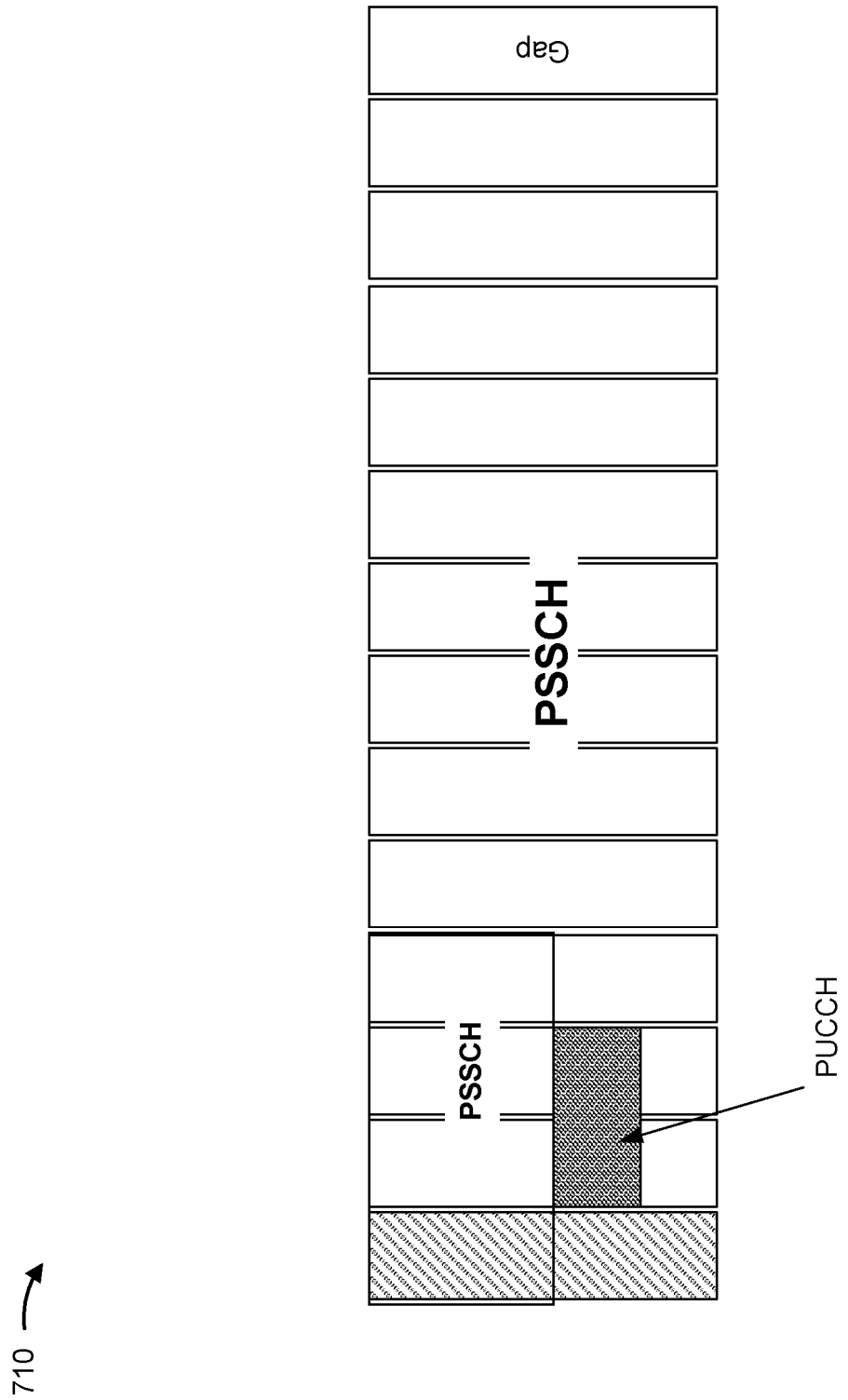

FIGS. 7A and 7B are diagrams illustrating examples 700, 710 associated with signal-based resource sharing between an anchor UE and a base station, in accordance with various aspects of the present disclosure. Examples 700 and 710 show slot configurations including symbols that allow a UE (e.g., anchor UE 305-1) to indicate to a base station (e.g., base station 110) whether one or more resources allocated to the anchor UE 305-1 for a sidelink channel will be used by the anchor UE 305-1 for sidelink communications with one or more client UEs (e.g., client UEs 305-2).

In some aspects, the anchor UE 305-1 may transmit, to the base station 110, a control channel message. Accordingly, the base station 110 may receive, from the anchor UE 305-1, the control channel message. In some aspects, the control channel message may indicate that at least a portion of a set of resources is to be used by the anchor UE 305-1. Accordingly, the base station 110 may refrain from using that portion of the set of resources. Additionally, or alternatively, the control channel message may indicate that at least a portion of a set of resources will not be used by the anchor UE 305-1. Accordingly, the base station 110 may use that portion of the set of resources for communicating with other UEs (e.g., UEs not on the sidelink channel).

As shown in example 700 of FIG. 7A, the control channel message may comprise a PSCCH message (shown as "Special PSCCH" in example 700 of FIG. 7A). For example, the anchor UE 305-1 may transmit the PSCCH message to the base station 110 to indicate whether at least a portion of a set of resources will be used by the anchor UE 305-1. As further shown in example 700 of FIG. 7A, the anchor UE 305-1 may transmit the PSCCH message in a selected sub-channel and/or in a configured symbol (e.g., symbol 1).

In some aspects, the PSCCH message may be transmitted in a resource defined by RRC. For example, the base station 110 may allocate the selected sub-channel and/or the configured symbol for the PSCCH message, and/or the anchor UE 305-1 may be preloaded (e.g., programmed, stored, and/or the like) with the selected sub-channel and/or the configured symbol.

In some aspects, the anchor UE 305-1 may rate match the PSCCH message based at least in part on a PSSCH (e.g., the PSSCH surrounding the PSCCH message in example 700 of FIG. 7A). Accordingly, the base station 110 may decode the PSCCH message without blind decoding. In some aspects, the base station 110 may decode the PSCCH message by performing SCI decoding on the selected sub-channel. For example, the base station 110 may decode the PSCCH message similarly to decoding piggyback uplink control information (UCI).

Additionally, or alternatively, as shown in example 710 of FIG. 7B, the control channel message may comprise UCI. For example, as further shown in FIG. 7B, the UCI may be transmitted on a PUCCH (shown as "Special PUCCH" in example 710 of FIG. 7B). For example, the anchor UE 305-1 may transmit the UCI in a PUCCH message to the base station 110 to indicate whether at least a portion of a set of resources will be used by the anchor UE 305-1. As further shown in example 710 of FIG. 7B, the anchor UE 305-1 may transmit the PUCCH message in a selected sub-channel and/or in configured symbols (e.g., symbols 2 and 3). As further shown in example 710 of FIG. 7B, the anchor UE 305-1 may use time division duplexing for the PUCCH message (e.g., by using multiple symbols rather than one symbol). Accordingly, the anchor UE 305-1 may avoid rate matching the PUCCH message around other PUCCH messages in the same slot.

In some aspects, the PUCCH message may be transmitted in a resource defined by RRC. For example, the base station 110 may allocate the selected sub-channel and/or the configured symbols for the PUCCH message, and/or the anchor UE 305-1 may be preloaded (e.g., programmed, stored, and/or the like) with the selected sub-channel and/or the configured symbols.

In some aspects, the anchor UE 305-1 may rate match the PUCCH message based at least in part on a PSSCH (e.g., the PSSCH surrounding the PSCCH message in example 700 of FIG. 7A). For example, the anchor UE 305-1 may rate match the PUCCH message when transmissions on the sidelink channel (e.g., a PC5 interface) and transmissions on an uplink with the base station 110 (e.g., a Uu interface) are not time division duplexed. Accordingly, the base station 110 may decode the PUCCH message without blind decoding.

In some aspects, the control channel message (whether a PSCCH message as shown in FIG. 7A, a PUCCH message as shown in FIG. 7B, and/or the like) may include information indicating how long the anchor UE 305-1 will (or will not) use one or more resources allocated to the anchor UE 305-1 for a sidelink channel. Accordingly, by using the control channel message depicted FIG. 7A and/or FIG. 7B, the anchor UE 305-1 may indicate to the base station 110 whether the one or more resources will be used by the anchor UE 305-1.

In some aspects, the anchor UE 305-1 may communicate, with at least one second UE (e.g., client UEs 305-2), on a sidelink channel using at least a portion of the set of resources without interference when the control channel message indicates that the anchor UE 305-1 will be using the portion of the set of resources. Additionally, or alternatively, the base station 110 may communicate, with at least one second UE (e.g., UEs not on the sidelink channel, such as the other UEs described above), using at least a portion of the set of resources without interference when the control channel message indicates that the anchor UE 305-1 will not be using the portion of the set of resources. As a result, the base station 110 may reuse resources allocated to the anchor UE 305-1 for the sidelink channel when the anchor UE 305-1 is not using those resources. Accordingly, the base station 110 may reduce network overhead while still avoiding interference with the sidelink channel.

As indicated above, FIGS. 7A and 7B are provided as examples. Other examples may differ from what is described with respect to FIGS. 7A and 7B.

Figure 8:
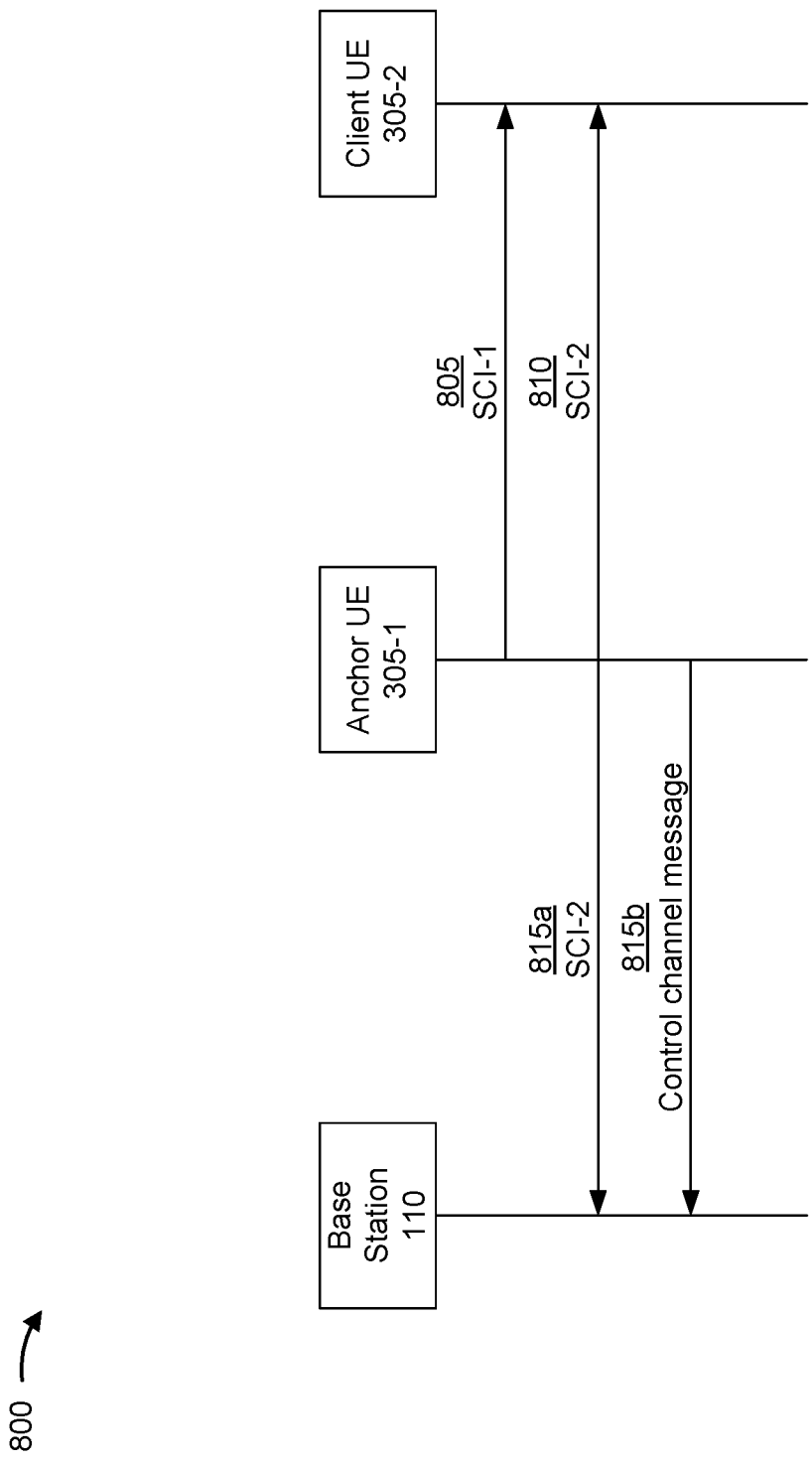
FIG. 8 is a diagram illustrating another example of signal-based resource sharing between an anchor UE and a base station, in accordance with various aspects of the present disclosure.

FIG. 8 is a diagram illustrating another example of signal-based resource sharing between an anchor UE and a base station, in accordance with various aspects of the present disclosure. Similar to examples 700 and 710 described above in connection with FIGS. 7A and 7B, respectively, example 800 depicts a first UE (e.g., anchor UE 305-1) that indicates to a base station (e.g., base station 110) whether one or more resources allocated to the anchor UE 305-1 for a sidelink channel will be used by the anchor UE 305-1 for sidelink communications with one or more client UEs (e.g., client UE 305-2). Although described below in connection with the anchor UE 305-1 serving one client UE 305-2, the description applies equally to the anchor UE 305-1 serving a plurality of client UEs, such as two, three, four, and/or the like.

As shown in FIG. 8, the anchor UE 305-1 may schedule sidelink communications with the client UE 305-2. For example, as shown in connection with reference numbers 805 and 810, the anchor UE 305-1 may transmit first control information (e.g., SCI-1) and second control information (e.g., SCI-2), respectively, to the client UE 305-2. In some aspects, the first control information and the second control information may include first stage SCI and second stage SCI, respectively, as described above in connection with FIG. 5.

As further shown in FIG. 8 and in connection with reference number 815a, the anchor UE 305-1 may transmit, to the base station 110, SCI. For example, the SCI may include the second control information (e.g., SCI-2) that was also transmitted to the client UE 305-2. In some aspects, the SCI may indicate that a set of resources is to be used by the anchor UE 305-1. Additionally, or alternatively, the SCI may indicate that a set of resources will not be used by the anchor UE 305-1. For example, the SCI may include SCI-2 with an additional field that indicates how long the set of resources will (or will not) be used by the anchor UE 305-1.

In some aspects, the SCI may be transmitted on a PSSCH. For example, the base station 110 may decode a PSCCH message including the SCI without blind decoding.

Additionally, or alternatively, as further shown in FIG. 8 and in connection with reference number 815b, the anchor UE 305-1 may transmit, to the base station 110, a control channel message (e.g., as described above in connection with FIGS. 7A and 7B). In some aspects, the control channel message may indicate that a set of resources is to be used by the anchor UE 305-1. Additionally, or alternatively, the control channel message may indicate that a set of resources will not be used by the anchor UE 305-1. For example, the control channel message may indicate how long the set of resources will (or will not) be used by the anchor UE 305-1.

In some aspects, the anchor UE 305-1 may communicate, with the client UE 305-2, on a sidelink channel using at least a portion of the set of resources without interference when the SCI and/or the control channel message indicates that the anchor UE 305-1 will be using the portion of the set of resources. Additionally, or alternatively, the base station 110 may communicate, with at least one second UE (e.g., one or more UEs not on the sidelink channel), using at least a portion of the set of resources without interference when the SCI and/or the control channel message indicates that the anchor UE 305-1 will not be using the portion of the set of resources. As a result, the base station 110 may reuse resources allocated to the anchor UE 305-1 for the sidelink channel when the anchor UE 305-1 is not using those resources. Accordingly, the base station 110 may reduce network overhead while still avoiding interference with the sidelink channel.

As indicated above, FIG. 8 is provided as an example. Other examples may differ from what is described with respect to FIG. 8.

Figure 9:
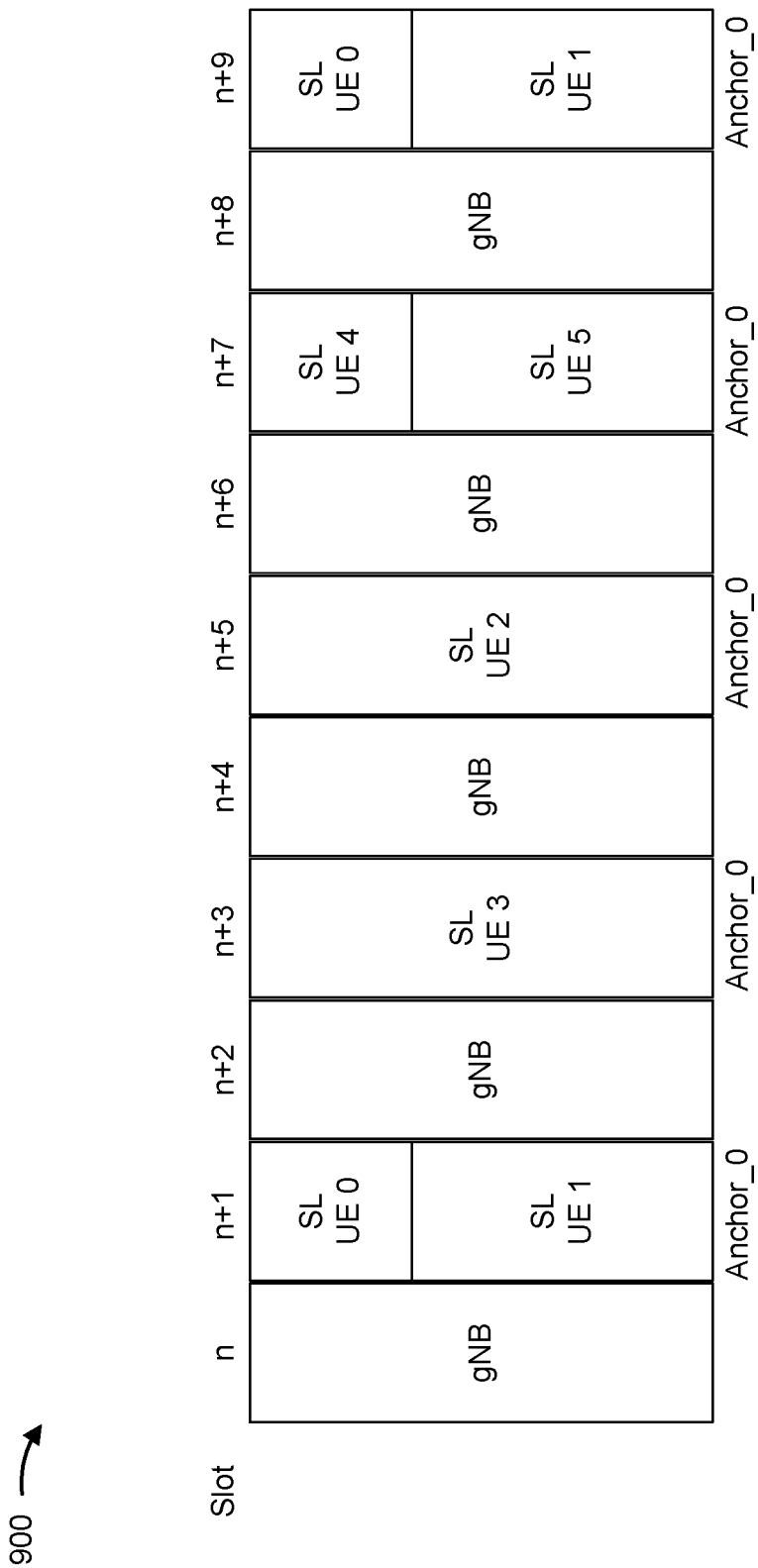
FIG. 9 is a diagram illustrating an example of slot allocation between an anchor UE and a base station, in accordance with various aspects of the present disclosure.

FIG. 9 is a diagram illustrating an example 900 of slot allocation between an anchor UE (e.g., anchor UE 305-1) and a base station (e.g., base station 110), in accordance with various aspects of the present disclosure. Example 900 shows slot allocations between the anchor UE 305-1 for use on a sidelink channel with one or more client UEs (e.g., client UEs 305-2) and the base station 110 for use in communicating (e.g., on a Uu interface) with one or more other UEs (e.g., UEs not on the sidelink channel). Although described below in connection with a plurality of client UEs 305-2, the description below equally applies to one client UE 305-2.

As shown in FIG. 9, a first set of resources reserved for the base station 110 (also referred to as "gNB" in example 900) may comprise a first pattern of slots, and a second set of resources reserved for the anchor UE 305-1 (also referred to as "Anchor 0" in example 900) may comprise a second pattern of slots. In example 900, the first pattern may include every even slot (e.g., slots 0, 2, 4, 6, 8, and/or the like), and the second pattern may include every odd slot (e.g., slots 1, 3, 5, 7, 9, and/or the like). In some aspects, as further shown in FIG. 9, the first pattern of slots and the second pattern of slots may not overlap.

Although described in connection with a single anchor UE 305-1 ("Anchor 0"), the description applies equally to a plurality of anchor UEs. For example, the base station 110 may further allocate the second set of resources amongst the plurality of anchor UEs. In example 900, for example, the base station 110 may allocate every other odd slot (e.g., slots 1, 5, 9, and/or the like) to a first anchor UE and remaining odd slots (e.g., slots 3, 7, and/or the like) to a second anchor UE.

In some aspects, the anchor UE 305-1 may further allocate the second set of resources amongst the plurality of client UEs 305-2. For example, the anchor UE 305-1 may further transmit, to at least one UE (e.g., "SL UE 0" in example 900) of the plurality of client UEs (e.g., "SL UE 0," "SL UE 1," "SL UE 2," "SL UE 3," "SL UE 4," and "SL UE 5" in example 900), a configuration message that indicates a first subset of the second set of resources reserved for the at least one UE (e.g., "SL UE 0" in example 900). As shown in FIG. 9, the first subset may be separated from remaining resources of the second set of resources in a frequency domain (e.g., the subset reserved for "SL UE 0" is on a different sub-channel than the subset reserved for "SL UE 1" and/or the like), a time domain (e.g., the subset reserved for "SL UE 0" includes different slots than the subset reserved for "SL UE 4" and/or the like), or some combination thereof (e.g., the subset reserved for "SL UE 0" is on a different sub-channel and includes different slots than the subset reserved for "SL UE 5"; the subset reserved for "SL UE 3" includes at least one different sub-channel and includes different slots than the subset reserved for "SL UE 0"; and/or the like).

Additionally, the anchor UE 305-1 may further transmit, to at least one other UE (e.g., "SL UE 1" in example 900) of the plurality of second UEs, a configuration message that indicates a second subset of the second set of resources reserved for the at least one other UE (e.g., "SL UE 1" in example 900). As further shown in FIG. 9, and similar to the first subset, the second subset may be separated from the first subset in a frequency domain, a time domain, or some combination thereof.

By using the allocation described in connection with FIG. 9, the base station 110 may avoid collisions with sidelink communications of the anchor UE 305-1. Accordingly, the base station 110 may improve sidelink quality and/or reliability.

As indicated above, FIG. 9 is provided as an example. Other examples may differ from what is described with respect to FIG. 9.

Figure 10:
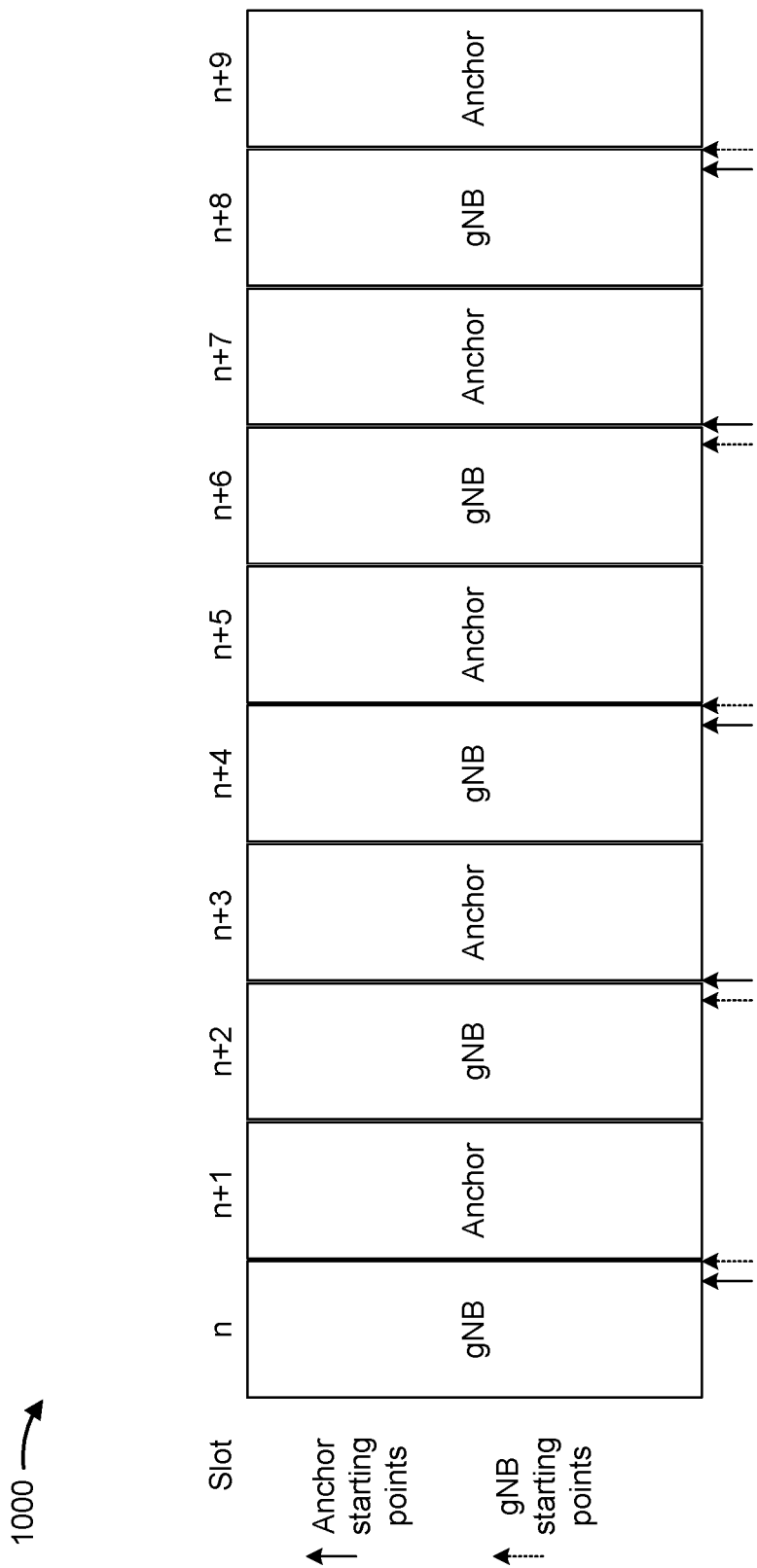
FIG. 10 is a diagram illustrating an example of starting points within slots for an anchor UE and a base station, in accordance with various aspects of the present disclosure.

FIG. 10 is a diagram illustrating an example 1000 of starting points within slots for an anchor UE (e.g., anchor UE 305-1) and a base station (e.g., base station 110), in accordance with various aspects of the present disclosure. Similar to example 900 described in connection with FIG. 9, example 1000 shows slot allocations between the anchor UE 305-1 for use on a sidelink channel with one or more client UEs (e.g., client UEs 305-2) and the base station 110 for use in communicating (e.g., on a Uu interface) with one or more other UEs (e.g., UEs not on the sidelink channel). Although described below in connection with one client UE 305-2, the description below equally applies to a plurality of client UEs 305-2.

Similar to example 900 described in connection with FIG. 9, the base station 110 may have allocated a first set of resources reserved for the base station 110 (also referred to as "gNB" in example 1000) that includes a first pattern of slots, and a second set of resources reserved for the anchor UE 305-1 (also referred to as "Anchor" in example 1000) that includes a second pattern of slots. In example 1000, the first pattern may include every even slot (e.g., slots 0, 2, 4, 6, 8, and/or the like), and the second pattern may include every odd slot (e.g., slots 1, 3, 5, 7, 9, and/or the like).

As further shown in FIG. 10, the anchor UE 305-1 may receive, from the base station, a first indication of a first starting position for the anchor UE 305-1 in at least one of the second set of resources reserved for the anchor UE 305-1. In example 1000, the first indication applies to every other odd slot (e.g., slots 1, 5, 9, and/or the like) but may apply to all slots of the second set of resources or a different pattern of slots in the second set of resources.

Moreover, in example 1000, the first starting position is before a starting position for the base station 110 but may alternatively be after a starting position for the base station 110. Accordingly, the anchor UE 305-1 may have priority in a slot when the first starting position is after the starting position for the base station 110, and (as shown in example 1000) the base station 110 may have priority in a slot when the starting position for the base station 110 is after the first starting position. For example, the base station 110 and the anchor UE 305-1 may use a listen-before-talk protocol in the second set of resources such that whichever of the base station 110 or the anchor UE 305-1 has an earlier starting point in a slot of the second set of resources has priority to transmit in that slot. In some aspects, whichever of the base station 110 or the anchor UE 305-1 has the earlier starting point in the slot of the second set of resources may use an extended cyclic prefix when transmitting to fill a gap between the earlier starting point and a later starting point of the other of the base station 110 or the anchor UE 305-1. Accordingly, the cyclic prefix may establish priority in the slot according to the listen-before-talk protocol without transmitting information that a recipient of the transmission needs to decode.

Additionally, at least one of the first starting position for the anchor UE 305-1 and the starting position for the base station 110 may be located at a boundary of the at least one of the second set of resources. In example 1000, the starting position for the base station 110 is located at the boundary.

In some aspects, as further shown in FIG. 10, the anchor UE 305-1 may receive, from the base station, a second indication of a second starting position for the anchor UE 305-1 in at least one other of the second set of resources reserved for the anchor UE 305-1. In example 1000, the second indication applies to remaining odd slots (e.g., slots 3, 7, and/or the like), but may apply to all slots of the second set of resources or a different pattern of slots in the second set of resources.

Moreover, in example 1000, the second starting position is after a starting position for the base station 110 but may alternatively be before a starting position for the base station 110. Accordingly, as shown in example 1000, the anchor UE 305-1 may have priority in a slot when the second starting position is after the starting position for the base station 110, and the base station 110 may have priority in a slot when the starting position for the base station 110 is after the second starting position. For example, as described above, the base station 110 and the anchor UE 305-1 may use a listen-before-talk protocol in the second set of resources such that whichever of the base station 110 or the anchor UE 305-1 has an earlier starting point in a slot of the second set of resources has priority to transmit in that slot. In some aspects, as described above, whichever of the base station 110 or the anchor UE 305-1 has the earlier starting point in the slot of the second set of resources may use an extended cyclic prefix when transmitting to fill a gap between the earlier starting point and a later starting point of the other of the base station 110 or the anchor UE 305-1.

Additionally, as described above, at least one of the second starting position for the anchor UE 305-1 and the starting position for the base station 110 may be located at a boundary of the at least one of the second set of resources. In example 1000, the second starting position is located at the boundary.

By using the contention-based procedure described in connection with FIG. 10, the base station 110 may reuse resources allocated to the anchor UE 305-1 without interfering with sidelink communications of the anchor UE 305-1. Accordingly, the base station 110 may reduce network overhead.

As indicated above, FIG. 10 is provided as an example. Other examples may differ from what is described with respect to FIG. 10.

Figure 11:
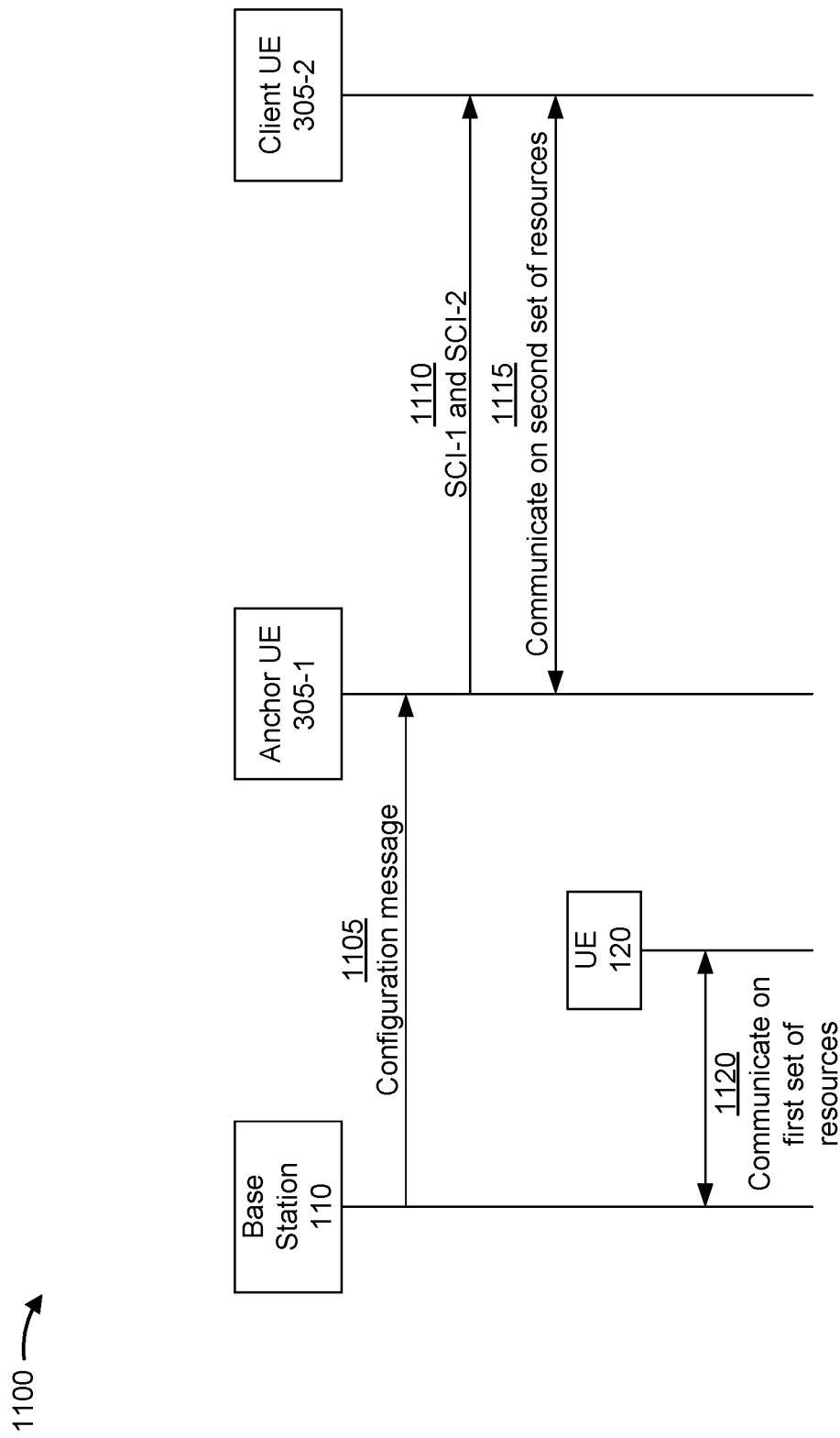
FIG. 11 is a diagram illustrating an example of contention-based resource sharing between an anchor UE and a base station, in accordance with various aspects of the present disclosure.

FIG. 11 is a diagram illustrating an example 1100 of contention-based resource sharing between an anchor UE 305-1 and a base station 110, in accordance with various aspects of the present disclosure. As shown in FIG. 11, example 1100 includes a first UE (e.g., the anchor UE 305-1) communicating on a sidelink channel with at least one second UE (e.g., the client UE 305-2), and the base station 110 communicating (e.g., on a Uu interface) with at least one third UE (e.g., a UE not on the sidelink channel, such as the UE 120). Although described below in connection with one client UE 305-2, the description below equally applies to a plurality of client UEs 305-2.

As shown in connection with reference number 1105, the base station 110 may transmit, to the anchor UE 305-1, a configuration message. Accordingly, as further shown in connection with reference number 1105, the anchor UE 305-1 may receive the configuration message from the base station 110. In some aspects, the configuration message may indicate a first set of resources reserved for the base station 110 and a second set of resources reserved for the anchor UE 305-1.

In some aspects, the first set of resources and the second set of resources may be allocated at least partially in a frequency domain. For example, the first set of resources may include at least one sub-channel not included in the second set of resources, and/or the second set of resources may include at least one sub-channel not included in the first set of resources. Additionally, or alternatively, the first set of resources and the second set of resources may be allocated at least partially in a time domain. For example, the first set of resources may include at least one slot not included in the second set of resources, and/or the second set of resources may include at least one slot not included in the first set of resources.

In some aspects (e.g., as described above in connection with FIG. 9), the first set of resources may comprise a first pattern of slots, and the second set of resources may comprise a second pattern of slots. For example, the first pattern of slots and the second pattern of slots may not overlap.

Additionally, or alternatively, in some aspects and as described above in connection with FIG. 10, the base station 110 may further transmit, to the anchor UE 305-1, a first indication of a first starting position for the anchor UE 305-1 in at least one of the second set of resources reserved for the anchor UE 305-1. Additionally, in some aspects and as described above in connection with FIG. 10, the base station 110 may further transmit, to the anchor UE 305-1, a second indication of a second starting position for the anchor UE 305-1 in at least one of the second set of resources reserved for the anchor UE 305-1. Accordingly, as described above in connection with FIG. 10, the base station 110 may configure respective priorities of the base station 110 and the anchor UE 305-1 in the second set of resources based at least in part on the first starting position, the second starting position, or a combination thereof.

In some aspects, the anchor UE 305-1 may further allocate the second set of resources between a plurality of client UEs. For example, as described above in connection with FIG. 9, the anchor UE 305-1 may transmit, to at least one UE (e.g., the client UE 305-2) of the plurality of client UEs, a configuration message that indicates a first subset of the second set of resources reserved for the at least one UE. In some aspects, the first subset may be separated from remaining resources of the second set of resources in a frequency domain, a time domain, or some combination thereof (e.g., as described above in connection with FIG. 9).

Additionally, in some aspects and as described above in connection with FIG. 9, the anchor UE 305-1 may transmit, to at least one other UE of the plurality of client UEs, a configuration message that indicates a second subset of the second set of resources reserved for the at least one other UE. In some aspects, the second subset may be separated from the first subset in a frequency domain, a time domain, or some combination thereof (e.g., as described above in connection with FIG. 9).

As shown in connection with reference number 1110, the anchor UE 305-1 may schedule sidelink communications with the client UE 305-2. For example, the anchor UE 305-1 may transmit first control information (e.g., SCI-1) and second control information (e.g., SCI-2) to the client UE 305-2. In some aspects, the first control information and the second control information may include first stage SCI and second stage SCI, respectively, as described above in connection with FIG. 5.

As shown in connection with reference number 1115, the anchor UE 305-1 may communicate, with the client UE 305-2, on the sidelink channel using the second set of resources. For example, the anchor UE 305-1 may exchange data with the client UE 305-2 on a PSSCH established in the second set of resources, control information with the client UE 305-2 on a PSCCH established in the second set of resources, and/or feedback signals with the client UE 305-2 on a PSFCH established in the second set of resources.

In some aspects, communicating with the client UE 305-2 may include transmitting, to the client UE 305-2, SCI indicating that one or more of the second set of resources are being used by the anchor UE 305-1 and the client UE 305-2. As described below in connection with reference number 1120, the base station 110 may decode the SCI to determine whether the base station 110 can use the one or more of the second set of resources (e.g., when the anchor UE 305-1 and the client UE 305-2 are not using the one or more of the second set of resources). In some aspects, the base station 110 may use blind decoding and/or rate matching to decode the SCI.

As shown in connection with reference number 1120, the base station 110 may communicate, with at least one second UE (e.g., the UE 120), using the first set of resources. For example, the base station 110 may exchange data with the UE 120 on a PUSCH and/or a PDSCH established in the first set of resources and/or control information with the UE 120 on a PUCCH and/or a PDCCH established in the first set of resources.

In some aspects, the base station 110 may receive SCI from the anchor UE 305-1 (e.g., as described above in connection with reference number 1115). Accordingly, the base station 110 may communicate, with the UE 120, using the second set of resources (e.g., in addition to or in lieu of the first set of resources) based at least in part on determining that the SCI indicates that the one or more of the second set of resources are not being used by the anchor UE 305-1. For example, the base station 110 may exchange data with the UE 120 on a PUSCH and/or a PDSCH established in the second set of resources and/or control information with the UE 120 on a PUCCH and/or a PDCCH established in the second set of resources.

Accordingly, by using the contention-based resource sharing described in connection with FIGS. 9-11, the base station 110 may communicate with UE 120 without interfering with communications between the anchor UE 305-1 and the client UE 305-2. Moreover, the base station 110 may reuse resources allocated to the anchor UE 305-1 when the anchor UE 305-1 is not using those resources. Accordingly, the base station 110 may reduce network overhead while still avoiding interference with the sidelink channel between the anchor UE 305-1 and the client UE 305-2.

The contention-based resource sharing between the anchor UE 305-1 and the base station 110 described in connection with FIGS. 9-11 may be combined with the signal-based resource sharing between the anchor UE 305-1 and the base station 110 described in connection with FIGS. 7A-8. For example, the anchor UE 305-1 may transmit one or more control channel messages to the base station 110 (e.g., as described in connection with examples 710 and 720) that indicates which resources in a second set of resources allocated by the base station 110 (e.g., as described in connection with examples 900 and 1000) will be used by the anchor UE 305-1. In another example, the anchor UE 305-1 may transmit SCI-2 to the base station 110 (e.g., as described in connection with example 800) that indicates which resources in a second set of resources allocated by the base station 110 (e.g., as described in connection with examples 900 and 1000) will be used by the anchor UE 305-1. In yet another example, the base station 110 may decode SCI (e.g., as described above in connection with reference numbers 1115 and 1120) to determine whether the anchor UE 305-1 is using a current slot as well as decoding one or more control channel messages (e.g., as described in connection with examples 710 and 720) and/or SCI-2 (e.g., as described in connection with example 800) from the anchor UE 305-1 to determine whether the anchor UE 305-1 will use future slots.

As indicated above, FIG. 11 is provided as an example. Other examples may differ from what is described with respect to FIG. 11.

Figure 12:
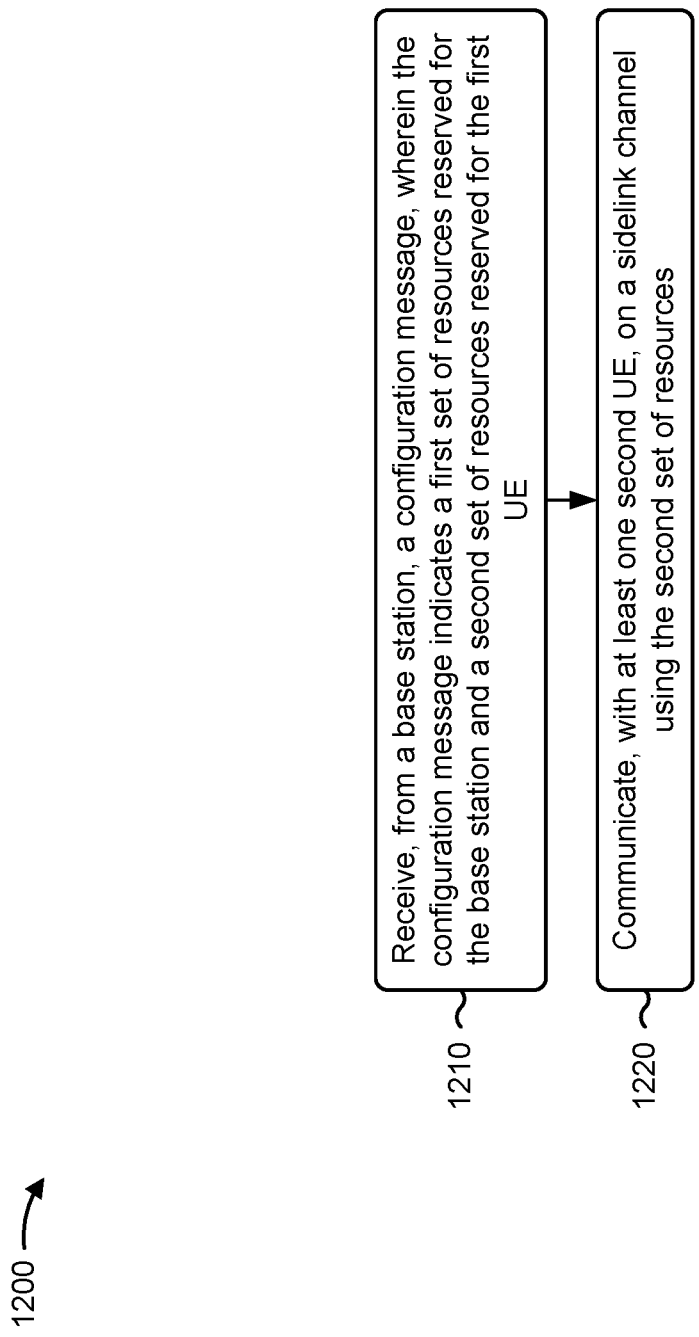
FIG. 12 is a diagram illustrating an example process performed by a UE, in accordance with various aspects of the present disclosure.

FIG. 12 is a diagram illustrating an example process 1200 performed, for example, by a first UE, in accordance with various aspects of the present disclosure. Example process 1200 is an example where the first UE (e.g., UE 120, anchor UE 305-1, and/or the like) performs operations associated with resource sharing between a base station and the first UE on a sidelink channel.

As shown in FIG. 12, in some aspects, process 1200 may include receiving, from a base station, a configuration message (block 1210). For example, the first UE (e.g., using receive processor 258, transmit processor 264, controller/processor 280, memory 282, and/or the like) may receive, from the base station (e.g., base station 110 and/or the like), the configuration message, as described above. In some aspects, the configuration message indicates a first set of resources reserved for the base station and a second set of resources reserved for the first UE.

As further shown in FIG. 12, in some aspects, process 1200 may include communicating, with at least one second UE, on a sidelink channel using the second set of resources (block 1220). For example, the first UE (e.g., using receive processor 258, transmit processor 264, controller/processor 280, memory 282, and/or the like) may communicate, with the at least one second UE (e.g., client UE 305-2 and/or the like), on the sidelink channel using the second set of resources, as described above.

Process 1200 may include additional aspects, such as any single aspect or any combination of aspects described below and/or in connection with one or more other processes described elsewhere herein.

In a first aspect, the first UE is an anchor on the sidelink channel, and the at least one second UE is a client on the sidelink channel.

In a second aspect, alone or in combination with the first aspect, the first set of resources and the second set of resources are allocated at least partially in a frequency domain.

In a third aspect, alone or in combination with one or more of the first and second aspects, the first set of resources and the second set of resources are allocated at least partially in a time domain.

In a fourth aspect, alone or in combination with one or more of the first through third aspects, the first set of resources comprise a first pattern of slots, and the second set of resources comprise a second pattern of slots, wherein the first pattern of slots and the second pattern of slots do not overlap.

In a fifth aspect, alone or in combination with one or more of the first through fourth aspects, the at least one second UE comprises one second UE.

In a sixth aspect, alone or in combination with one or more of the first through fifth aspects, the at least one second UE comprises a plurality of second UEs.

In a seventh aspect, alone or in combination with one or more of the first through sixth aspects, process 1200 further includes transmitting, to at least one UE of the plurality of second UEs, a configuration message that indicates a first subset of the second set of resources reserved for the at least one UE.

In an eighth aspect, alone or in combination with one or more of the first through seventh aspects, the first subset is separated from remaining resources of the second set of resources in a frequency domain, a time domain, or some combination thereof.

In a ninth aspect, alone or in combination with one or more of the first through eighth aspects, process 1200 further includes transmitting, to at least one other UE of the plurality of second UEs, a configuration message that indicates a second subset of the second set of resources reserved for the at least one other UE.

In a tenth aspect, alone or in combination with one or more of the first through ninth aspects, the second subset is separated from the first subset in a frequency domain, a time domain, or some combination thereof.

In an eleventh aspect, alone or in combination with one or more of the first through tenth aspects, process 1200 further includes receiving, from the base station, a first indication of a first starting position for the first UE in at least one of the second set of resources reserved for the first UE.

In a twelfth aspect, alone or in combination with one or more of the first through eleventh aspects, the first starting position for the first UE is after a starting position for the base station or before the starting position for the base station.

In a thirteenth aspect, alone or in combination with one or more of the first through twelfth aspects, at least one of the first starting position for the first UE and the starting position for the base station is located at a boundary of the at least one of the second set of resources.

In a fourteenth aspect, alone or in combination with one or more of the first through thirteenth aspects, process 1200 further includes receiving, from the base station, a second indication of a second starting position for the first UE in at least one other of the second set of resources reserved for the first UE.

In a fifteenth aspect, alone or in combination with one or more of the first through fourteenth aspects, communicating with the at least one second UE comprises: transmitting, to the at least one second UE, SCI indicating whether one or more of the second set of resources are being used by the first UE and the at least one second UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
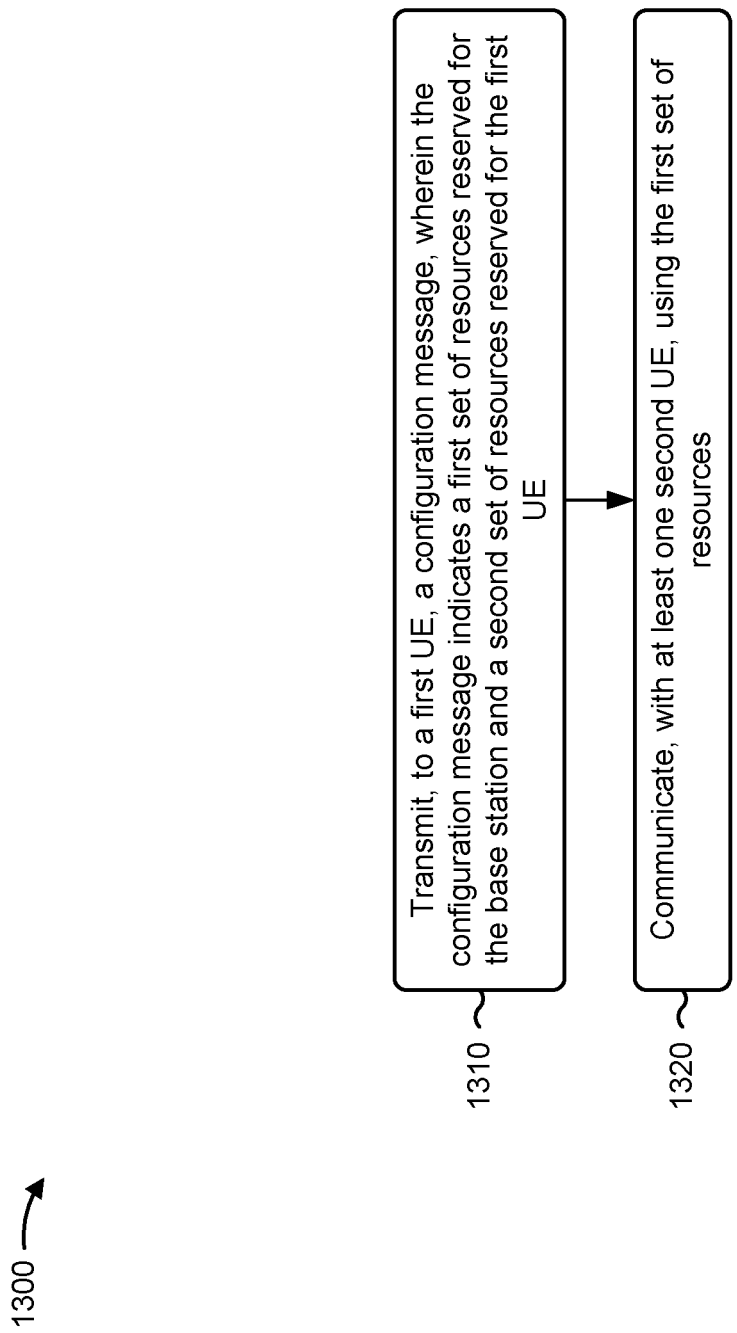
FIG. 13 is a diagram illustrating an example process performed by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., base station 110 and/or the like) performs operations associated with resource sharing between the base stations and an anchor UE on a sidelink channel.

As shown in FIG. 13, in some aspects, process 1300 may include transmitting, to a first UE, a configuration message (block 1310). For example, the base station (e.g., using transmit processor 220, receive processor 238, controller/processor 240, memory 242, and/or the like) may transmit, to the first UE (e.g., anchor UE 305-1 and/or the like), the configuration message, as described above. In some aspects, the configuration message indicates a first set of resources reserved for the base station and a second set of resources reserved for the first UE.

As further shown in FIG. 13, in some aspects, process 1300 may include communicating, with at least one second UE, using the first set of resources (block 1320). For example, the base station (e.g., using transmit processor 220, receive processor 238, controller/processor 240, memory 242, and/or the like) may communicate, with the at least one second UE, using the first set of resources, as described above.

Process 1300 may include additional aspects, such as any single aspect or any combination of aspects described below and/or in connection with one or more other processes described elsewhere herein.

In a first aspect, the first UE is an anchor on a sidelink channel, and at least one third UE is a client on the sidelink channel.

In a second aspect, alone or in combination with the first aspect, the first set of resources and the second set of resources are allocated at least partially in a frequency domain.

In a third aspect, alone or in combination with one or more of the first and second aspects, the first set of resources and the second set of resources are allocated at least partially in a time domain.

In a fourth aspect, alone or in combination with one or more of the first through third aspects, the first set of resources comprise a first pattern of slots, and the second set of resources comprise a second pattern of slots, wherein the first pattern of slots and the second pattern of slots do not overlap.

In a fifth aspect, alone or in combination with one or more of the first through fourth aspects, the first UE is configured to communicate with a third UE.

In a sixth aspect, alone or in combination with one or more of the first through fifth aspects, the first UE is configured to communicate with a plurality of third UEs.

In a seventh aspect, alone or in combination with one or more of the first through sixth aspects, process 1300 further includes transmitting, to the first UE, a first indication of a first starting position for the first UE in at least one of the second set of resources reserved for the first UE.

In an eighth aspect, alone or in combination with one or more of the first through seventh aspects, the first starting position for the first UE is after a starting position for the base station or before the starting position for the base station.

In a ninth aspect, alone or in combination with one or more of the first through eighth aspects, at least one of the first starting position for the first UE and the starting position for the base station is located at a boundary of the at least one of the second set of resources.

In a tenth aspect, alone or in combination with one or more of the first through ninth aspects, process 1300 further includes transmitting, to the first UE, a second indication of a second starting position for the first UE in at least one other of the second set of resources reserved for the first UE.

In an eleventh aspect, alone or in combination with one or more of the first through tenth aspects, process 1300 further includes receiving, from the first UE, SCI indicating whether one or more of the second set of resources are being used by the first UE on a sidelink channel.

In a twelfth aspect, alone or in combination with one or more of the first through eleventh aspects, process 1300 includes communicating, with the at least one second UE, using the one or more of the second set of resources, based at least in part on determining that the SCI indicates that the one or more of the second set of resources are not being used by the first UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
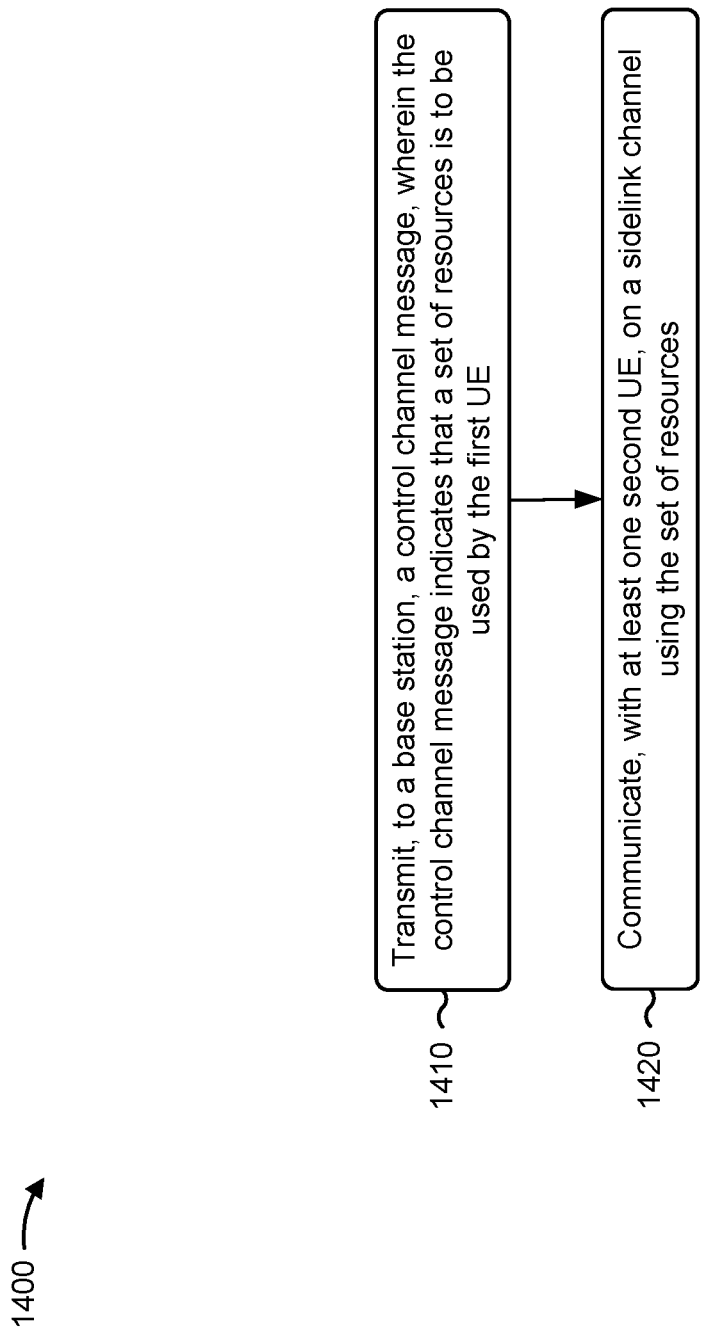
FIG. 14 is a diagram illustrating another example process performed by a UE, in accordance with various aspects of the present disclosure.

FIG. 14 is a diagram illustrating an example process 1400 performed, for example, by a first UE, in accordance with various aspects of the present disclosure. Example process 1400 is an example where the first UE (e.g., UE 120, anchor UE 305-1, and/or the like) performs operations associated with resource sharing between a base station and the first UE on a sidelink channel.

As shown in FIG. 14, in some aspects, process 1400 may include transmitting, to a base station, a control channel message (block 1410). For example, the first UE (e.g., using receive processor 258, transmit processor 264, controller/processor 280, memory 282, and/or the like) may transmit, to the base station (e.g., base station 110 and/or the like), the control channel message, as described above. In some aspects, the control channel message indicates that a set of resources is to be used by the first UE.

As further shown in FIG. 14, in some aspects, process 1400 may include communicating, with at least one second UE, on a sidelink channel using the set of resources (block 1420). For example, the first UE (e.g., using receive processor 258, transmit processor 264, controller/processor 280, memory 282, and/or the like) may communicate, with the at least one second UE (e.g., client UE 305-2 and/or the like), on the sidelink channel using the set of resources, as described above.

Process 1400 may include additional aspects, such as any single aspect or any combination of aspects described below and/or in connection with one or more other processes described elsewhere herein.

In a first aspect, the first UE is an anchor on the sidelink channel, and at least one second UE is a client on the sidelink channel.

In a second aspect, alone or in combination with the first aspect, the control channel message comprises a PSCCH message.

In a third aspect, alone or in combination with one or more of the first and second aspects, the PSCCH message is transmitted in a resource defined by a radio resource configuration.

In a fourth aspect, alone or in combination with one or more of the first through third aspects, the first UE rate matches the PSCCH message based at least in part on a PSSCH.

In a fifth aspect, alone or in combination with one or more of the first through fourth aspects, the control channel message comprises UCI.

In a sixth aspect, alone or in combination with one or more of the first through fifth aspects, the UCI is transmitted on a PUCCH.

In a seventh aspect, alone or in combination with one or more of the first through sixth aspects, the first UE rate matches the PUCCH based at least in part on a PSSCH.

In an eighth aspect, alone or in combination with one or more of the first through seventh aspects, the control channel message comprises SCI.

In a ninth aspect, alone or in combination with one or more of the first through eighth aspects, the SCI is transmitted on a PSSCH.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram illustrating an example process 1500 performed, for example, by a base station, in accordance with various aspects of the present disclosure. Example process 1500 is an example where the base station (e.g., base station 110 and/or the like) performs operations associated with resource sharing between the base station and an anchor UE on a sidelink channel.

As shown in FIG. 15, in some aspects, process 1500 may include receiving, from a first UE, a control channel message (block 1510). For example, the base station (e.g., using transmit processor 220, receive processor 238, controller/processor 240, memory 242, and/or the like) may receive, from the first UE (e.g., anchor UE 305-1 and/or the like), the control channel message, as described above. In some aspects, the control channel message indicates that a set of resources will not be used by the first UE.

As further shown in FIG. 15, in some aspects, process 1500 may include communicating, with at least one second UE, using the set of resources (block 1520). For example, the base station (e.g., using transmit processor 220, receive processor 238, controller/processor 240, memory 242, and/or the like) may communicate, with the at least one second UE, using the set of resources, as described above.

Process 1500 may include additional aspects, such as any single aspect or any combination of aspects described below and/or in connection with one or more other processes described elsewhere herein.

In a first aspect, the first UE is an anchor on a sidelink channel, and at least one third UE is a client on the sidelink channel.

In a second aspect, alone or in combination with the first aspect, the control channel message comprises a PSCCH message.

In a third aspect, alone or in combination with one or more of the first and second aspects, the PSCCH message is transmitted in a resource defined by a radio resource configuration.

In a fourth aspect, alone or in combination with one or more of the first through third aspects, the PSCCH message is rate matched based at least in part on a PSSCH.

In a fifth aspect, alone or in combination with one or more of the first through fourth aspects, the control channel message comprises UCI.

In a sixth aspect, alone or in combination with one or more of the first through fifth aspects, the UCI is transmitted on a PUCCH.

In a seventh aspect, alone or in combination with one or more of the first through sixth aspects, the PUCCH is rate matched based at least in part on a PSSCH.

In an eighth aspect, alone or in combination with one or more of the first through seventh aspects, the control channel message comprises SCI.

In a ninth aspect, alone or in combination with one or more of the first through eighth aspects, the SCI is transmitted on a PSSCH.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
    a memory; and
    one or more processors coupled to the memory, the one or more processors configured to:
        receive a configuration message, wherein the configuration message indicates a first set of resources reserved for a network and a second set of resources reserved for the first UE; and
        communicate, with at least one second UE, on a sidelink channel using the second set of resources.

2. The apparatus of claim 1, wherein the first UE is an anchor on the sidelink channel, and the at least one second UE is a client on the sidelink channel.

3. The apparatus of claim 1, wherein the first set of resources and the second set of resources are allocated at least partially in a frequency domain, at least partially in a time domain, or some combination thereof.

4. The apparatus of claim 1, wherein the first set of resources comprise a first pattern of slots, and the second set of resources comprise a second pattern of slots, wherein the first pattern of slots and the second pattern of slots do not overlap.

5. The apparatus of claim 1, wherein the at least one second UE comprises one second UE.

6. The apparatus of claim 1, wherein the one or more processors are further configured to:
    communicate, with a plurality of second UEs, on the sidelink channel using the second set of resources, wherein the plurality of second UEs include the at least one second UE.

7. The apparatus of claim 6, wherein the one or more processors are further configured to:
    transmit, to at least one UE of the plurality of second UEs, a configuration message that indicates a first subset of the second set of resources reserved for the at least one UE.

8. The apparatus of claim 7, wherein the first subset is separated from remaining resources of the second set of resources in a frequency domain, a time domain, or some combination thereof.

9. The apparatus of claim 7, wherein the one or more processors are further configured to:
transmit, to at least one other UE of the plurality of second UEs, a configuration message that indicates a second subset of the second set of resources reserved for the at least one other UE.

10. The apparatus of claim 9, wherein the second subset is separated from the first subset in a frequency domain, a time domain, or some combination thereof.

11. The apparatus of claim 1, wherein the one or more processors are further configured to:
receive a first indication of a first starting position for the first UE in a slot of the second set of resources reserved for the first UE.

12. The apparatus of claim 11, wherein the first starting position for the first UE is after a starting position for the network or before the starting position for the network.

13. The apparatus of claim 12, wherein at least one of the first starting position for the first UE and the starting position for the network is located at a slot boundary of the second set of resources.

14. The apparatus of claim 11, wherein the one or more processors are further configured to:
receive a second indication of a second starting position for the first UE in another slot of the second set of resources reserved for the first UE.

15. The apparatus of claim 1, wherein, to communicate with the at least one second UE, the one or more processors are configured to:
transmit, to the at least one second UE, sidelink control information (SCI) indicating whether a subset of the second set of resources are being used by the first UE and the at least one second UE.

16. An apparatus for wireless communication at a network node, comprising:
a memory; and
one or more processors coupled to the memory, the one or more processors configured to:
transmit, to a first user equipment (UE), a configuration message, wherein the configuration message indicates a first set of resources reserved for the network node and a second set of resources reserved for the first UE; and
communicate, with at least one second UE, using the first set of resources.

17. An apparatus for wireless communication at a first user equipment (UE), comprising:
a memory; and
one or more processors coupled to the memory, the one or more processors configured to:
receive a configuration message from a network node, wherein the configuration message indicates a set of resources reserved for the first UE;
transmit a control channel message to the network node, wherein the control channel message indicates that a subset of the set of resources is to be used by the first UE; and
communicate, with at least one second UE, on a sidelink channel using the subset of the set of resources.

18. The apparatus of claim 17, wherein the first UE is an anchor on the sidelink channel, and at least one second UE is a client on the sidelink channel.

19. The apparatus of claim 17, wherein the control channel message comprises a physical sidelink control channel (PSCCH) message or uplink control information (UCI) on a physical uplink control channel (PUCCH) that is configured based at least in part on a physical sidelink shared channel (PSSCH).

20. The apparatus of claim 17, wherein the control channel message comprises sidelink control information (SCI) that is transmitted on a physical sidelink shared channel (PSSCH).

* * * * *